United States Patent
Che et al.

(10) Patent No.: US 8,983,437 B2
(45) Date of Patent: Mar. 17, 2015

(54) SYSTEM FOR ACTIVELY NOTIFYING INSTANT MESSAGES AND LOCATIONS IN A CERTAIN AREA AND METHOD THEREFOR

(71) Applicant: Feng Sheng Information Co., Ltd., Kaohsiung (TW)

(72) Inventors: Yung-Chien Che, Kaohsiung (TW); Meng-Ying Tsai, Kaohsiung (TW); Ming-Yao Chao, Kaohsiung (TW); Ti-Han Lee, Kaohsiung (TW); Chun-Pan Luo, Fujian Province (CN)

(73) Assignee: Feng Sheng Information Co., Ltd., Kaohsiung (TW)

( * ) Notice: Subject to any disclaimer, the term of this patent is extended or adjusted under 35 U.S.C. 154(b) by 0 days.

(21) Appl. No.: 13/898,528

(22) Filed: May 21, 2013

(65) Prior Publication Data

US 2014/0349618 A1    Nov. 27, 2014

(51) Int. Cl.
*H04M 1/725*    (2006.01)
*H04W 24/00*    (2009.01)
*H04W 68/00*    (2009.01)

(52) U.S. Cl.
CPC .................... *H04W 68/005* (2013.01)
USPC ..................... 455/412.2; 455/456.3

(58) Field of Classification Search
USPC ............................ 455/412.2, 456.3
See application file for complete search history.

(56) References Cited

U.S. PATENT DOCUMENTS

2008/0098005 A1\*    4/2008    Goradia ................. 707/10

\* cited by examiner

*Primary Examiner* — Joel Ajayi
(74) *Attorney, Agent, or Firm* — Alan D. Kamrath; Kamrath IP Lawfirm, P.A.

(57) ABSTRACT

A system for actively notifying instant messages and locations in a certain area and a method therefor contain a controlling device function module for judging messages and functions transmitted to a processing device function module of a at least one service device function module from a back-site device function module. The back-site device function module chooses the messages of the processing device function module. The at least one service device function module transmits the messages to a user handheld device from the back-site device function module, and the at least one service device function module includes a WiFi device and a processing device function module. The user handheld device transmits a regional location message, a language using system code, and a group identification code of the user handheld device to the at least one service device function module in the certain area.

18 Claims, 29 Drawing Sheets

US 8,983,437 B2

SYSTEM FOR ACTIVELY NOTIFYING INSTANT MESSAGES AND LOCATIONS IN A CERTAIN AREA AND METHOD THEREFOR

BACKGROUND OF THE INVENTION

1. Field of the Invention

The present invention relates to a system for actively notifying instant messages and locations in a certain area and a method therefore and, more particularly, to the system and the method which provide all messages and locations in a certain area so that users learn the latest information and contacts with his/her group members.

2. Description of the Prior Art

Conventionally, people travel or go shopping in certain areas (such as airports, scenic spots, department stores, convenience stores, etc.), but they cannot understand every certain area and language. Although in each certain area, WiFi (Wireless Fidelity) or fixed computer operating platforms are provided to various users free of charge, and when operating a user handheld device via the WiFi, a series of input information has to be inputted into the user handheld device after acquiring key passwords to use the WiFi free of charge. Thereafter, the user operates the handheld device via the WiFi to obtain desired messages, but in operation of the handheld device, if the message is displayed in the user's unknown language, the user cannot operate the handheld device in an unknown language mode.

Also, if the user intends to know the messages in the certain areas by use of the fixed computer operating platform, he/she has to find the fixed computer operating platform, thus causing using inconvenience. Even though the user finds the fixed computer operating platform, he/she cannot operate the fixed computer operating platform in the unknown language mode. Therefore, the user can merely browse fixed messages in the certain areas but cannot learn instant messages and his/her current position in the certain area. Furthermore, for an individual user or group members, when he/she or they are in unfamiliar areas, the following defects still exist. i.e.:

1. The user cannot know all different languages, thus increasing personnel workload and costs in the certain areas.

2. When the user is in the unfamiliar area, he/she may get lost.

3. The user cannot learn and receive instant messages in the certain area.

4. The user loses using rights, because he/she cannot learn and receive instant messages in the certain areas.

5. If the group members are in a certain area, each group member cannot know the other group members' positions and status.

6. If the group members are in the certain area and cannot contact each other, they have to communicate by using phones, thereby having high telephone charges and international roaming charges.

The present invention has arisen to mitigate and/or obviate the afore-described disadvantages.

SUMMARY OF THE INVENTION

The primary objective of the present invention is to provide a system for actively notifying instant messages and locations in a certain area and a method therefor which are capable of learning information in a certain area for an individual user or group members.

A further objective of the present invention is to provide a system for actively notifying instant messages and locations in a certain area and a method therefor which learn maps and positions on the maps when the individual user or the group members are in the certain area.

Another objective of the present invention is to provide a system for actively notifying instant messages and locations in a certain area and a method therefor in which the user knows positions of the group members on the map and can contact the group members when he/she is in the certain area.

To obtain the above objectives, a system for actively notifying instant messages and locations in a certain area according to the present invention contains a controlling device function module used to judge messages and functions inputted from a back-site device function module and transmitted to a processing device function module of at least one service device function module. The controlling device function module judges if a using contract is valid to determine if the messages and the functions of the at least one service device function module are processed and are transmitted to a user handheld device by ways of a WiFi (Wireless Fidelity) device of the at least one service device function module. The back-site device function module chooses and controls the messages of the processing device function module of the at least one service device function module. Then, the controlling device function module judges if the using contract is valid to determine whether the messages of the processing device function module are transmitted to a user. The at least one service device function module transmits the messages to the user handheld device from the back-site device function module, with the at least one service device function module including the WiFi device and the processing device function module. The processing device function module has a text device module, a voice device module, an illustrated device module, an audio-visual device, a record storage module, a location information recording device module, a multi-language module, and a dynamic group management device module. The WiFi device calculates the messages of the processing device function module based on messages and internal codes transmitted from the user handheld device to provide messages and locations in a certain area to the user and to provide messages and functions to the user based on a using language. A user handheld device is arranged to transmit a regional location message, a language using system code, and a group identification code of the user handheld device to the at least one service device function module, when the user is in the certain area. Thereafter, language messages are processed by the processing device function module of the at least one service device function module and are transmitted to the user handheld device from the WiFi device. In addition, the user handheld device receives the language messages and language functions from the at least one service device function module, and the at least one service device function module judges the user's group type to provide group members' locations displayed on a map of the user handheld device to the user. Thus, the user and his/her group members transmit message signals to each other by using the at least one service device function module for a free cost to contact and communicate with the group members.

Also, a method for actively notifying instant messages and locations in a certain area according to the present invention contains:

step (A) when people carry handheld devices to the certain area, the at least one service device function module in the certain area senses the handheld devices, and then greeting messages are transmitted to the user handheld devices. Thereafter, the at least one service device function module automatically judges if an APP (Application) system is downloaded to the handheld devices;

step (B) if the APP system is downloaded to the user handheld devices, the at least one service device function module provides the messages of the certain area to the user, and, thereafter, the user operates services and functions provided by the system on the user handheld device;

step (C) if the at least one service device function module judges the APP system is not downloaded to the handheld devices, each handheld device provides two download methods including displaying A/I points on the handheld device, i.e., if the each handheld device uses an A system, it displays A/I points of the A system, and if the each handheld device uses an I system, it displays A/I points of the I system, and, then, after a download instruction is given, the APP system is downloaded via Internet to learn the messages and the functions provided by the system of the present invention. However, if the user does not agree to download the APP system, the each handheld device automatically skips a downloading process, so the user cannot learn the messages and the functions provided by the system of the present invention The two download methods also include applying a QR (Quick Response) Code scanning, i.e., people use a QR Code marked in the certain area to scan and download the APP system, such that the user learns the messages and the functions provided by the system of the present invention. However, if the user does not agree to download the APP system, the QR Code scanning is not executed, so the user cannot learn the messages and the functions provided by the system;

Step (D) when the user enters the certain area, a signal of the user handheld device connects with the at least one service device function module, and, then, the processing device function module processes and calculates, and, thereafter, the at least one service device function module transmits messages and function of the certain area to the user based on the regional location message and language using system code;

Step (E) since a number of the at least one service device function module which is arranged in the certain area depends on an area of the certain area, and in order to avoid a plurality of service device function modules in the same region transmitting different messages to the user, the plurality of service device function modules are limited to transmit one message to the user one time, i.e., when the user repeatedly passes through any one position of the plurality of service device function modules, the plurality of service device function modules automatically judge and confirm to avoid the user handheld device repeatedly receiving at least two messages at a same position of the plurality of service device function modules in a same area;

Step (F) when the user enters the certain area, the at least one service device function module transmits related messages of the certain area to the user handheld device, and a phone interface of the user handheld device displays a regional map and a message notice of the certain area, and a current position is automatically marked on the regional map, so that the user understands the current position of the regional map and the message notice; and Step (G) when the user leaves the certain area, the at least one service device function module displays traffic information of the certain area on a message display area of the phone interface of the user handheld device.

DETAILED DESCRIPTION OF THE PREFERRED EMBODIMENTS

The present invention will be clearer from the following description when viewed together with the accompanying drawings, which show, for purpose of illustration only, the preferred embodiments in accordance with the present invention.

Figure 1:
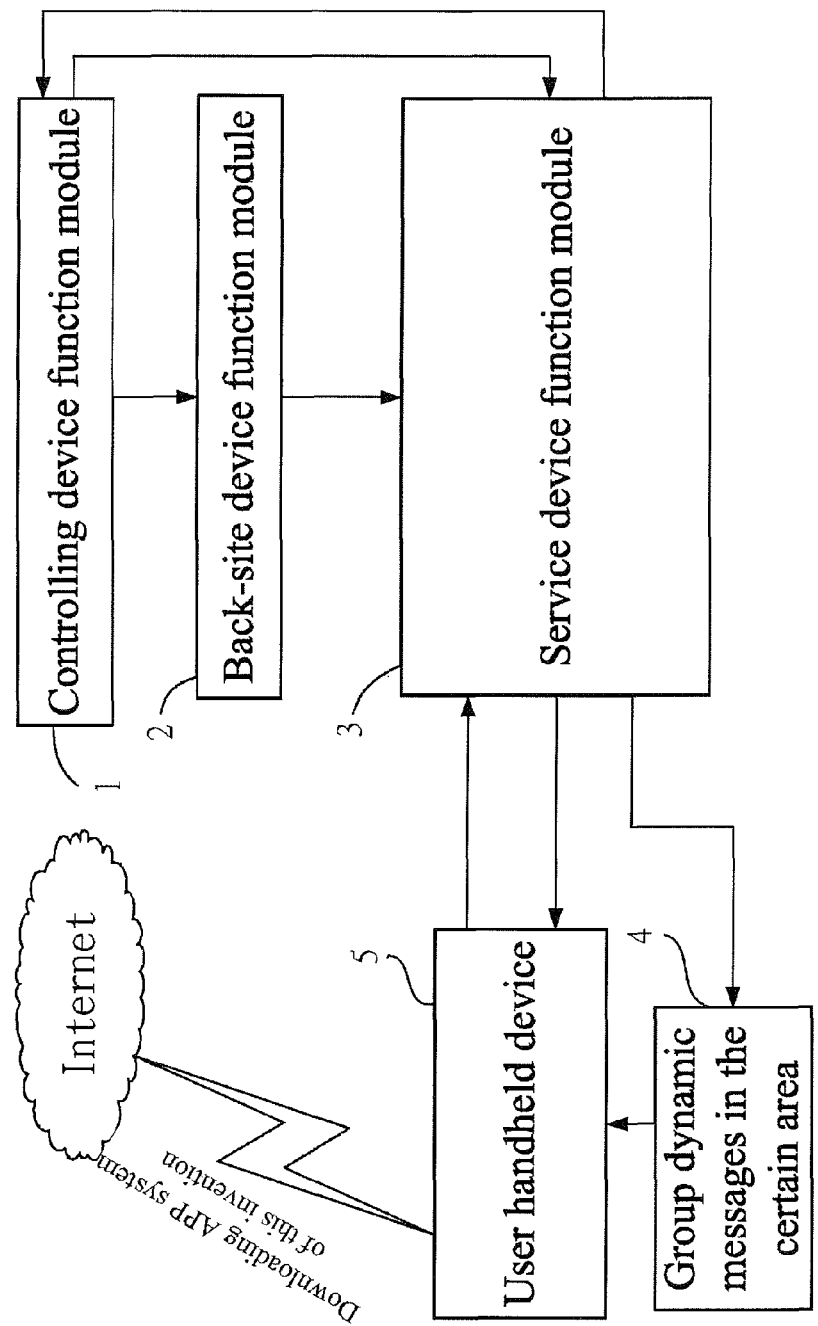
FIG. 1 is a diagram of a system for actively notifying instant messages and locations in a certain area and a method therefor according to the present invention.
Figure 2:
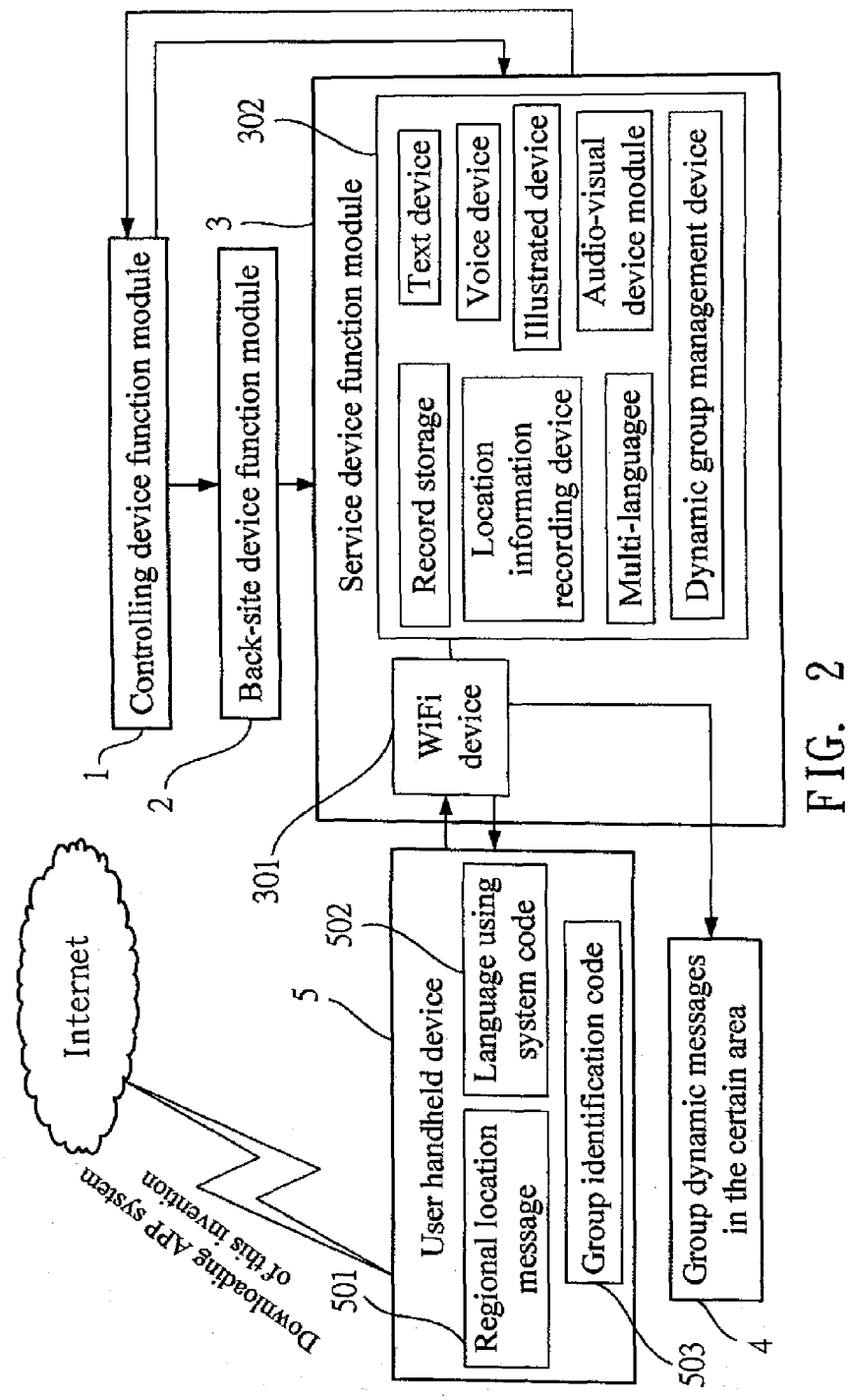
FIG. 2 is a diagram showing a structure of the system for actively notifying the instant messages and the locations in the certain area and the method therefor according to the present invention.

FIG. 1 is a diagram of a system for actively notifying instant messages and locations in a certain area according to the present invention. The system of the present invention comprises a controlling device function module 1, a back-site device function module 2, at least one service device function module 3, and a user handheld device 5. FIG. 2 is a diagram showing a structure of the system for actively notifying the instant messages and the locations in the certain area according to the present invention. The controlling device function module 1 is used to judge messages and functions inputted from the back-site device function module 2 and transmitted to a processing device function module 302 of the at least one service device function module 3. The controlling device function module 1 judges if a using contract is valid to determine if the messages and the functions of the at least one service device function module 3 are processed and are transmitted to the user handheld device 5 by ways of a WiFi (Wireless Fidelity) device 301 of the at least one service device function module 3.

The back-site device function module 2 is applied to choose and control the messages of the processing device function module 302 of the at least one service device function module 3. Then, the controlling device function module 1 judges if the using contract is valid to determine whether the messages of the processing device function module 302 are transmitted to a user.

The at least one service device function module 3 transmits the messages to the user handheld device 5 from the back-site device function module 2. The at least one service device function module 3 includes the WiFi device 301 and the processing device function module 302. The processing device function module 302 has a text device module, a voice device module, an illustrated device module, an audio-visual device, a record storage module, a location information recording device module, a multi-language module, and a dynamic group management device module. The WiFi device 301 is used for calculating the messages of the processing device function module 302 based on messages and internal codes transmitted from the user handheld device 5 to provide messages and locations in a certain area to the user and to provide messages and functions to the user based on a using language.

The user handheld device 5 is arranged to transmit a regional location message 501, a language using system code 502, and a group identification code 503 of the user handheld device 5 to the at least one service device function module 3, when the user is in the certain area. Thereafter, language messages are processed by the processing device function module 302 of the at least one service device function module 3 and are transmitted to the user handheld device 5 from the WiFi device 301. In addition, the user handheld device 5 receives the language messages and language functions from the at least one service device function module 3, and the at least one service device function module 3 judges the user's group type. If the user is one member of a certain group, the at least one service device function module 3 optionally transmits a dynamic message 4 of the certain group members to the user handheld device 5 to provide group members' locations displayed on a map of the user handheld device 5 to the user. Thus, the user and his/her group members transmit message signals to each other by using the at least one service device function module 3 free of cost to contact and communicate with the group members.

Figure 3:
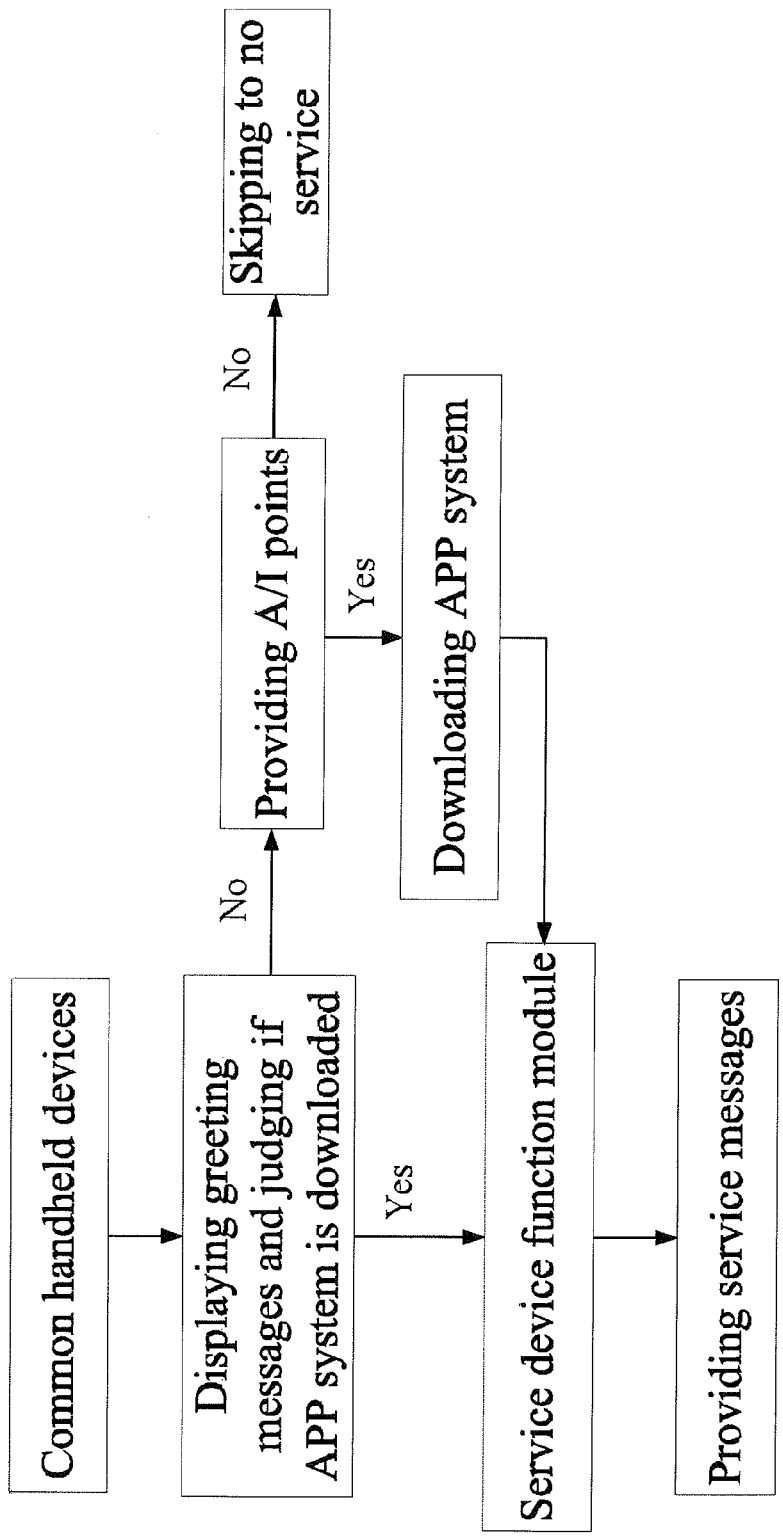
FIG. 3 is a flow chart showing the operation of the system for actively notifying the instant messages and the locations in the certain area and the method therefor according to the present invention.

With reference to FIGS. 1 to 3, when the system of the present invention is used in an airport, a method of the present invention comprises the following steps.

When people carry common handheld devices to the certain area, the at least one service device function module 3 in the certain area senses the common handheld devices (because WiFi functions of the user handhelds device are set on an ON mode after people download an APP (Application) system or after they automatically set the WiFi functions), and greeting messages are transmitted to the common handheld devices. Thereafter, the at least one service device function module 3 automatically judges if the APP system is downloaded to the common handheld devices. If so, the at least one service device function module 3 provides the messages of the certain area by using the language using system code 502 of the user handheld device 5. Thereafter, the user operates services and functions provided by the system of the present invention on the user handheld device 5.

If the at least one service device function module 3 judges the APP system is not downloaded to the common handheld devices, each common handheld device provides two download methods including displaying A/I points on the common handheld device, i.e., if the each common handheld device uses an A system, it displays A/I points of the A system, and if the each common handheld device uses an I system, it displays A/I points of the I system. After a download instruction is given, the APP system is downloaded via the Internet to learn the service messages and the functions provided by the system of the present invention. On the contrary, if the user does not agree to download the APP system, the each common handheld device automatically skips a downloading process, so the user cannot learn the service messages and the functions provided by the system of the present invention. The two download methods also include applying a QR (Quick Response) Code scanning, i.e., people use a QR Code marked in the certain area to scan and download the APP system, such that the user learns the service messages and the functions provided by the system of the present invention. On the contrary, if the user does not agree to download the APP system, the QR Code scanning is not executed, so the user cannot learn the service messages and the functions provided by the system of the present invention.

Figure 4:
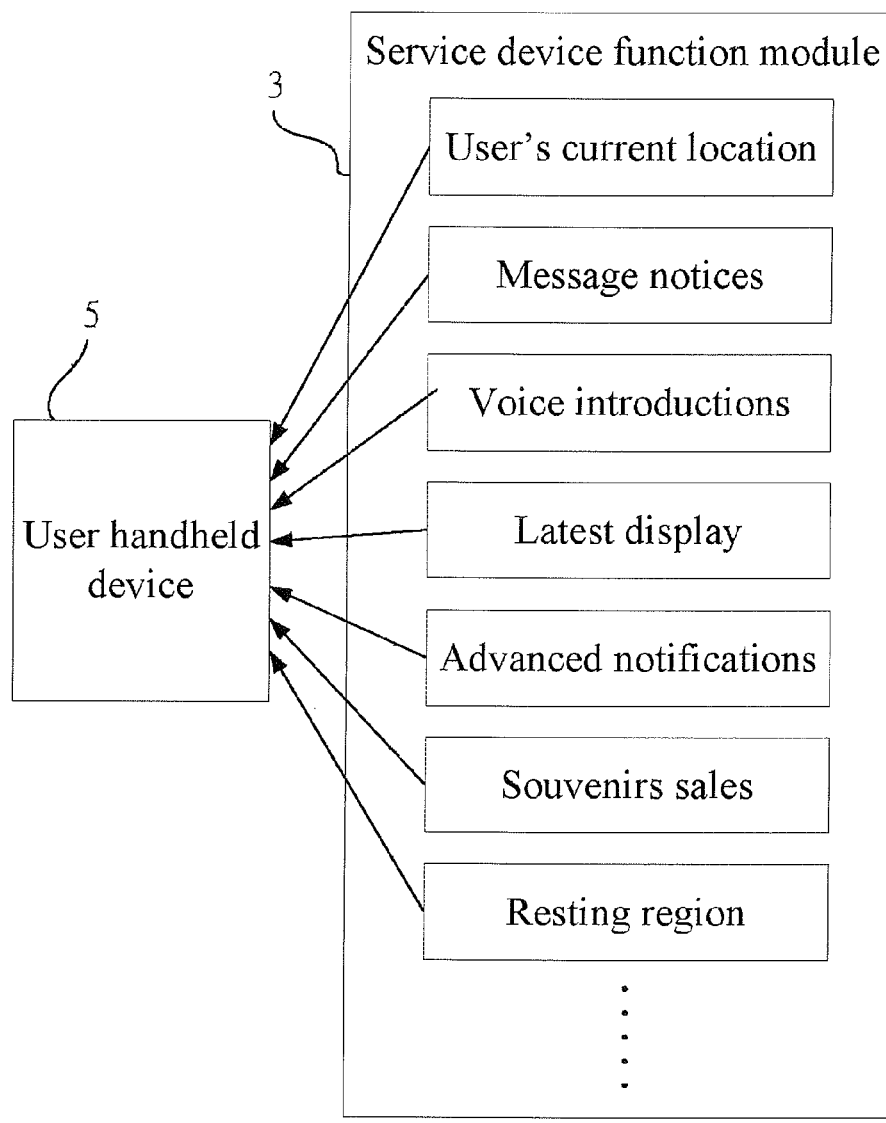
FIG. 4 is a diagram showing the operation of the system for actively notifying the instant messages and the locations in the certain area and the method therefor according to the present invention.
Figure 5A:
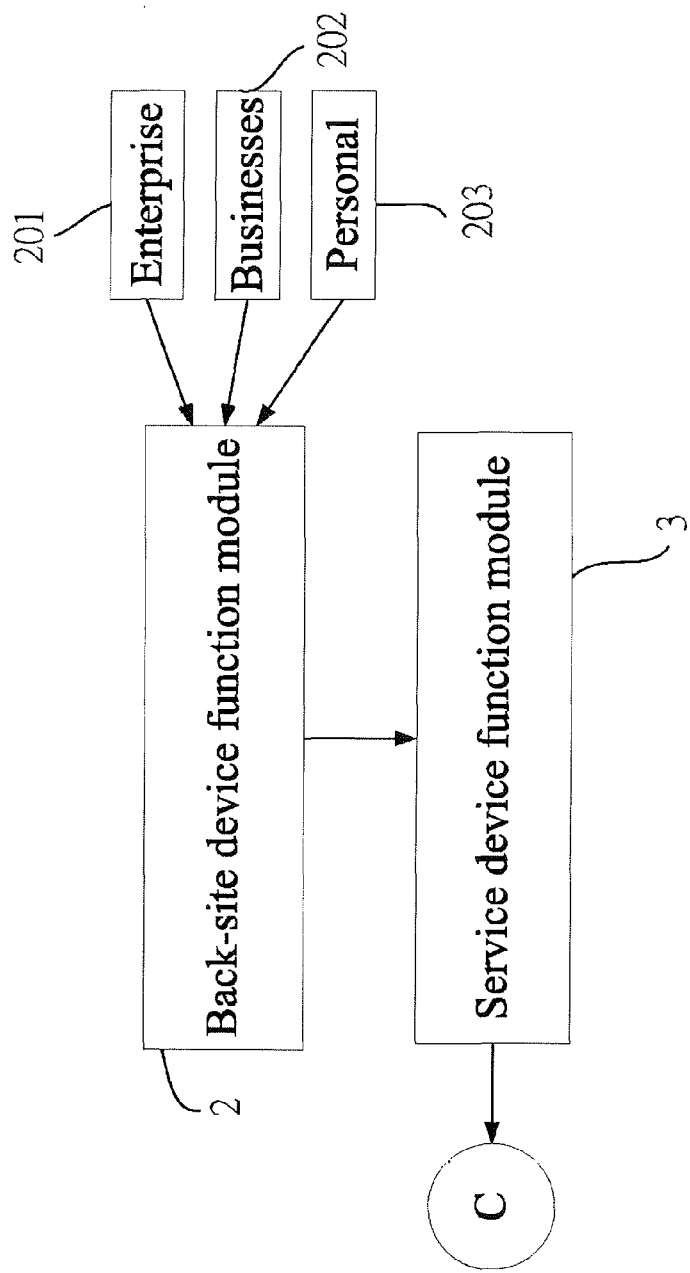
FIG. 5A is a diagram showing the operation of the system for actively notifying the instant messages and the locations in the certain area and the method therefor according to the present invention.
Figure 5B:
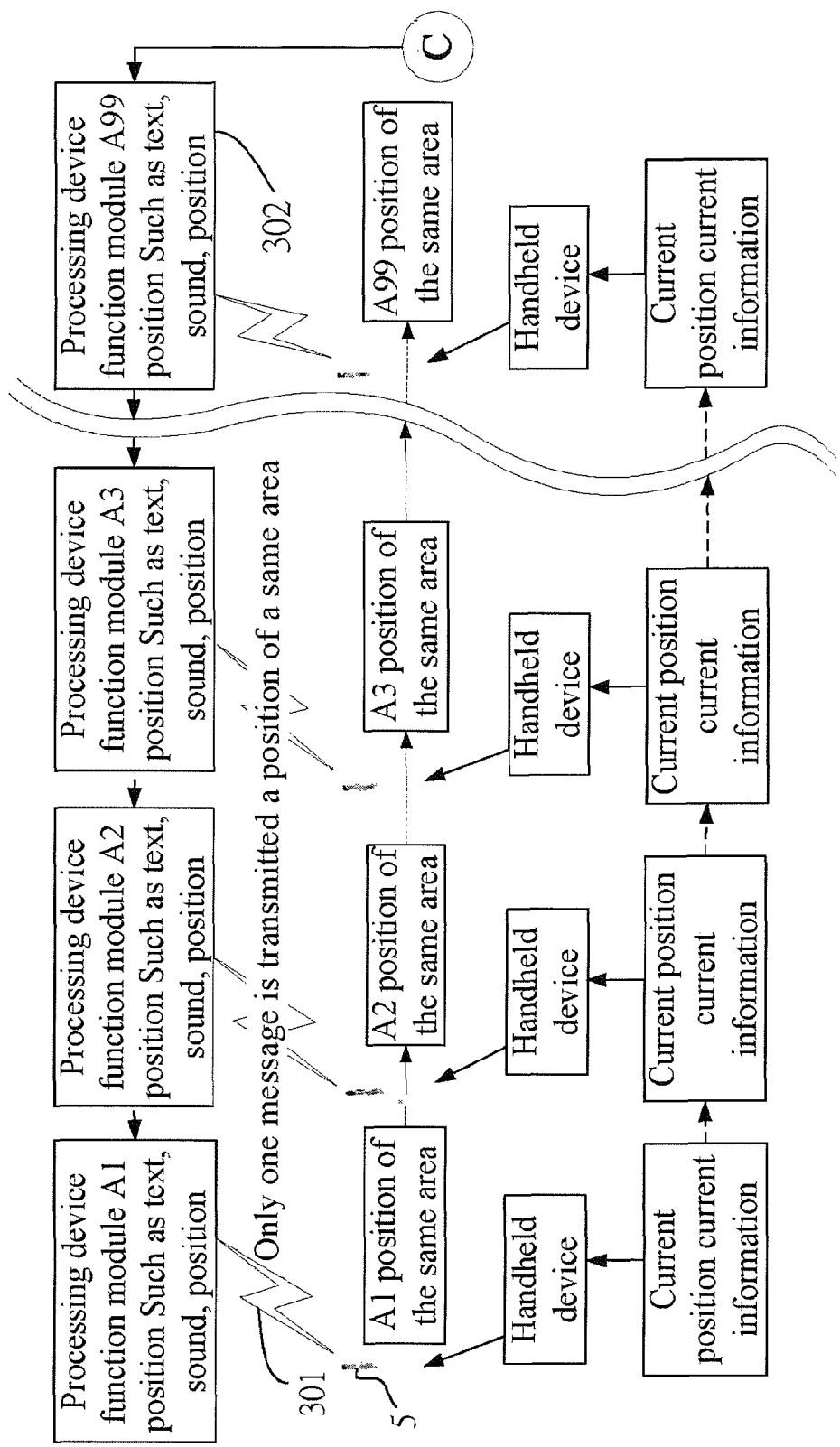
FIG. 5B is another diagram showing the operation of the system for actively notifying the instant messages and the locations in the certain area and the method therefor according to the present invention.

Referring further to FIGS. 2 and 4, when the user enters the certain area, a signal of the user handheld device 5 connects with the at least one service device function module 3, and the user handheld device 5 transmits the regional location message 501, the language using system code 502, and the group identification code 503 to the at least one service device function module 3. Then, the WiFi device 301 receives and transmits the regional location message 501, the language using system code 502, and the group identification code 503 to be further calculated and processed by the processing device function module 302. Thereafter, the at least one service device function module 3 transmits commonly used language messages and functions to the user according to the regional location message 501 and the language using system code 502. Thus, when the regional location message 501 displays the user is in the airport, as shown in FIG. 4, the at least one service device function module 3 provides messages of the airport to the user automatically, i.e., confirming the user's location in the airport, providing voice introductions, latest display messages, advanced notifications, souvenirs sales information, and resting-regional locations. As illustrated in FIGS. 5A and 5B, a number of the at least one service device function module 3 which is arranged in the airport depends on an area of the airport, and the at least one service device function module 3 receives messages from the back-site device function module 2. The messages are inputted by renters (such as an enterprise 201, a store or business 202 or an individual 203), so the at least one service device function module 3 receives the same message. To avoid a plurality of service device function modules 3 in the same region of the airport transmitting different messages to the user, the plurality of service device function modules 3 are limited to transmit one message to the user one time, i.e., the at least one device function module 3 automatically judges the user handheld device 5 which passes through. The WiFi device 301 transmits and judges signals to confirm if the user handheld device 5 has received a same message when it passes through the at least one device function module 3 at a A1 position. If not, the processing device function module 302 of the at least one service device function module 3 transmits the message to the user handheld device 5 at the A1 position. If the user handheld device 5 has received the same message when it passes through the at least one service device function module 3 at the A1 position, the processing device function module 302 of the at least one service device function module 3 does not transmit the message to the user handheld device 5. In other words, when the user passes through the plurality of service device function modules 3 of the A1 position to A99 position in a same region, the user handheld device 5 only receives the one message transmitted by one of the plurality of service device function modules 3. In other words, the user handheld device does not repeatedly receive the same message transmitted from the A1 position to the A99 position in the same region.

Figure 6A:
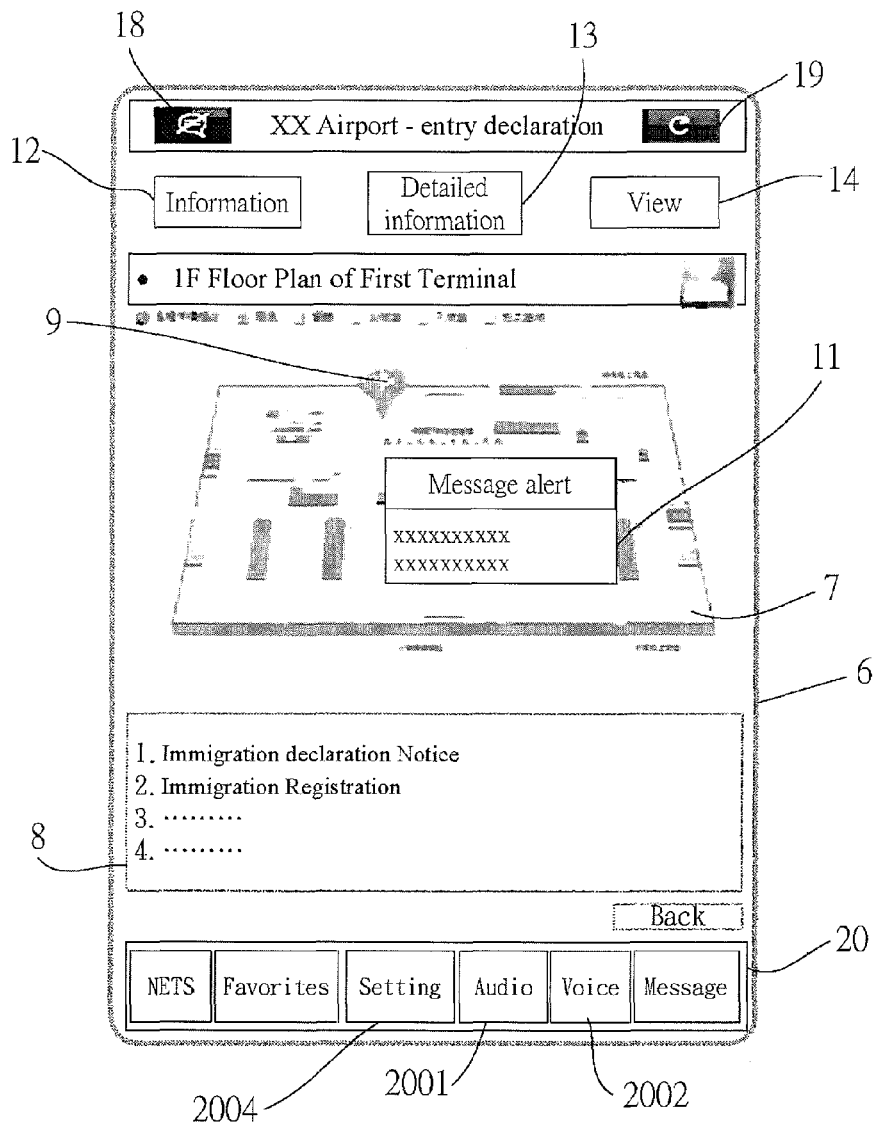
FIGS. 6A to 6E are diagrams showing the operation of the system for actively notifying the instant messages and the locations in an airport and the method therefor according to the present invention.
Figure 6B:
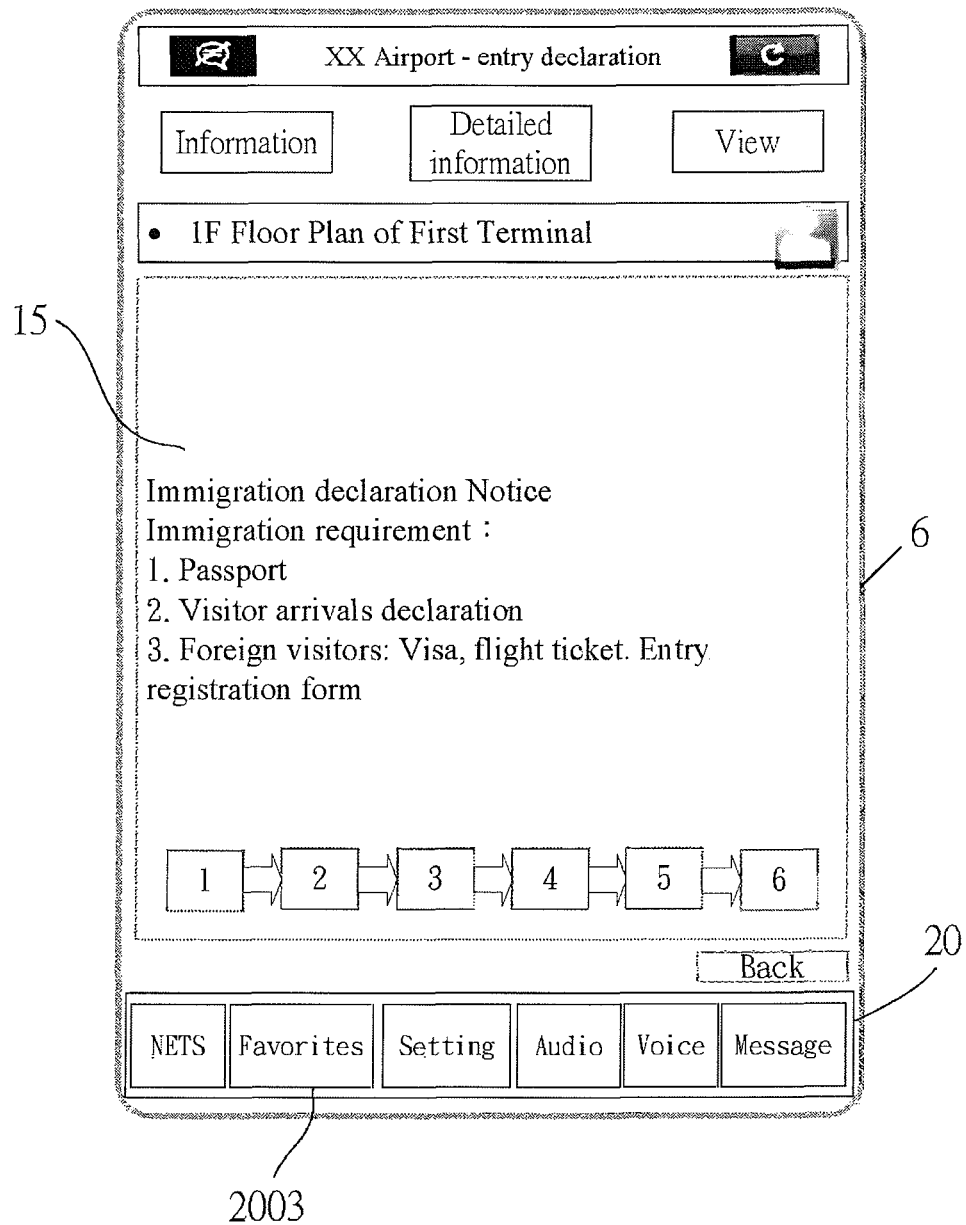
Figure 6C:
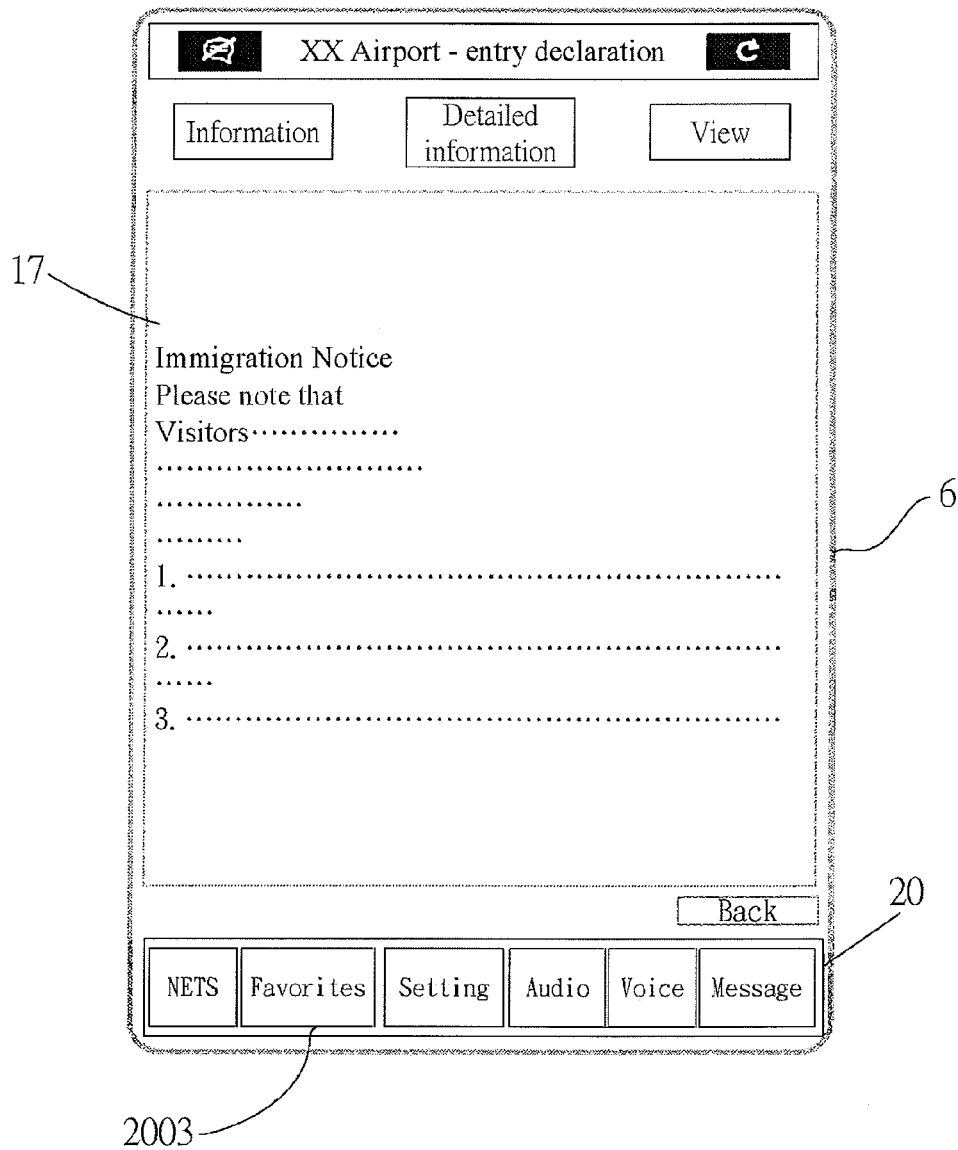
Figure 6D:
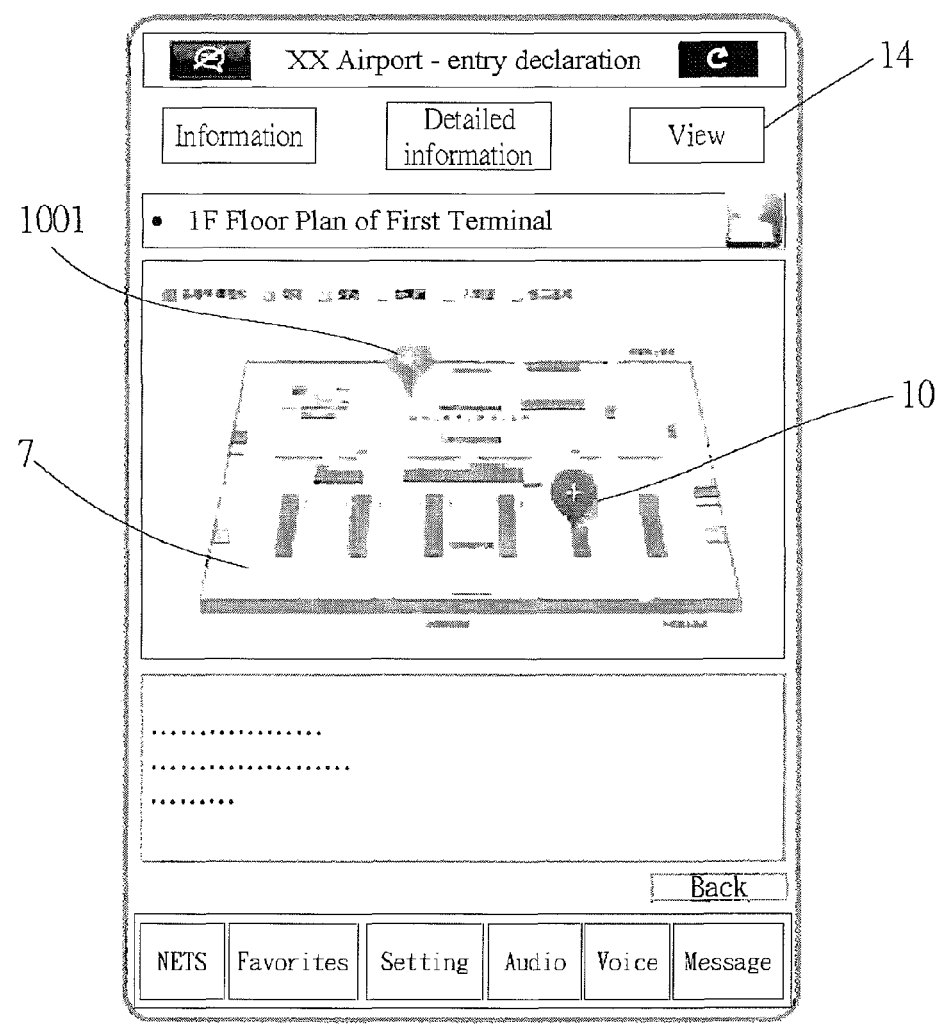

Referring further to FIG. 6A, when the user enters the certain area, such as the airport, the at least one service device function module 3 transmits related messages of the airport to the user handheld device 5, and a phone interface 6 of the user handheld device 5 displays a message alert 11, a regional map 7 and a message notice 8 of the airport. Also, a current position 9 is automatically marked on the regional map 7 of the airport, so that the user understands the current position 9 of the regional map 7 and the message notice 8 of the airport. Because the phone interface 6 has three function keys (i.e., an all information key 12, a detailed information key 13, and a plan view key 14), and when the user presses the all information key 12 of the phone interface 6, the message notice 8 of the phone interface 6 shows the message content 15 of each message. As shown in FIG. 6B, the user stores desired information to a favorite file of a phone. In other words, the user presses a favorites key 2003 of a function key area 20 of the phone interface 6. When the user presses the detailed information key 13 of the phone interface 6, information content 17 of each message of the message notice 8 is displayed. FIG. 6C shows the information content 17 of each message being stored in the favorite file, and the user presses the favorites key 2003 of the function key area 20 of the phone interface 6 to store the information content 17 of each message in the favorite file. When the user presses the plan view key 14 of the phone interface 6, the phone interface 6 only displays the regional map 7 of the airport. As illustrated in FIG. 6D, an original position 10 where the user enters the airport and a designated location 1001 where the user has reached are automatically displayed on the regional map 7, such that the user clearly knows his/her direction and position in the airport and does not get lost.

Figure 6E:
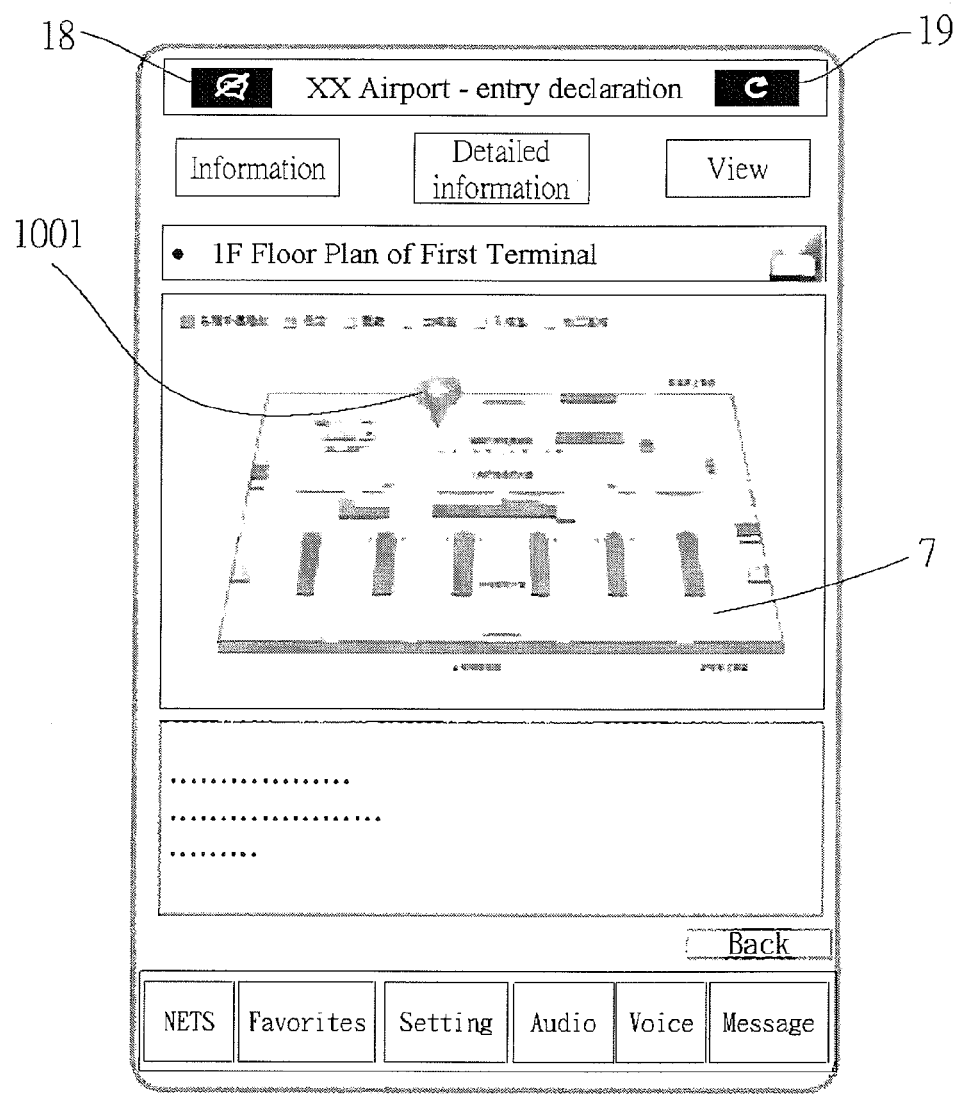
Figure 7:
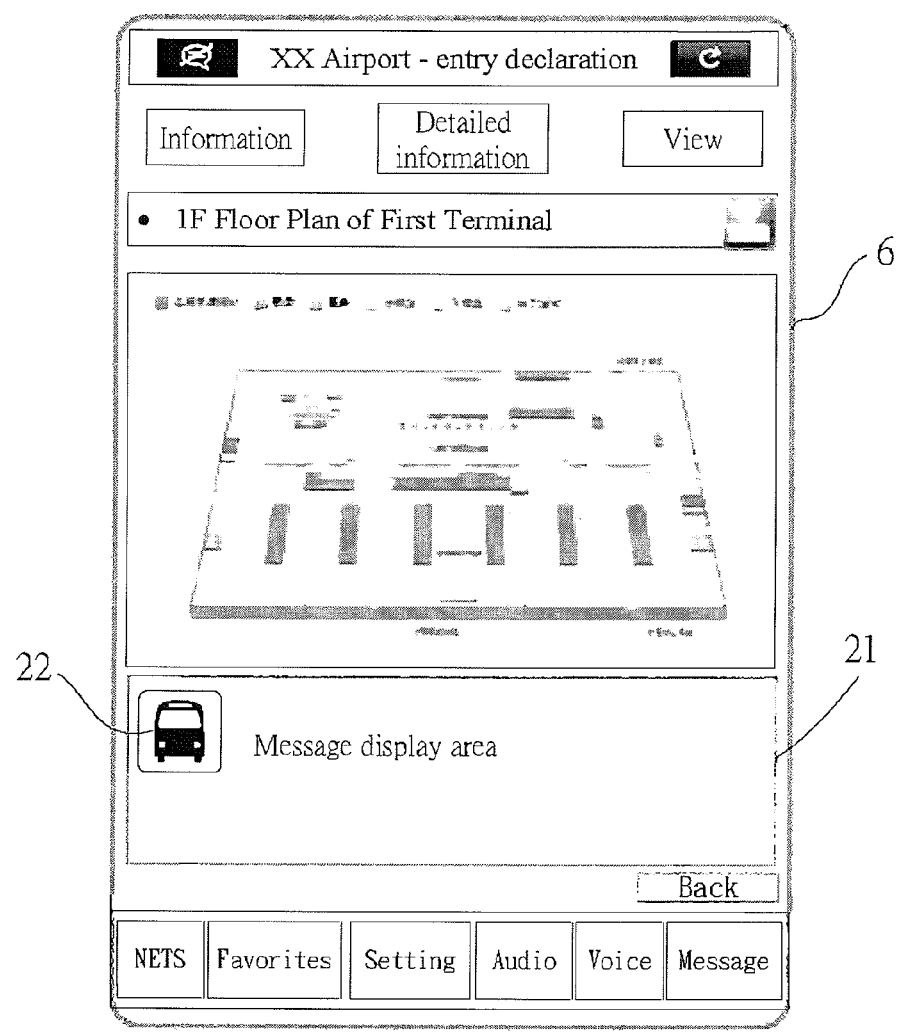
FIG. 7 is a diagram showing the operation of the system for actively notifying the instant messages and the locations and the method therefor when leaving the airport according to the present invention.

With reference to FIGS. 6E and 7, when the user leaves the airport (such as at a designated location 1001 shown in FIG. 6E), the at least one service device function module 3 displays traffic information 22 of the airport (illustrated in FIG. 7) on a message display area 21 of the phone interface 6 of the user handheld device 5. The message content and category of the message display area 21 are set in the back-site device function module 2 based on using requirements.

Referring further to FIG. 6A, when the user intends to set a time setting reminder in the airport, he/she presses a setting key 2004 of the function key area 20 of the phone interface 6 resulting in an input box (not shown) appearing. The user inputs a reminding message, such as go to a No. 23 boarding gate at PM 3:00. If a set time is up, the at least one service device function module 3 transmits a sound and a warning message (not shown) to the user handheld device 5 to remind the user.

As shown in FIG. 6A, when the user enters the airport and wants to update all the latest messages, he/she presses an updating key 19. If the user does not want to receive too many messages, he/she presses a no disturb key 18, so that the user handheld device 5 stops receiving messages transmitted from the at least one service device function module 3 until the user presses the no disturb key 18 again. Thereafter, the user handheld device 5 receives messages transmitted by the at least one service device function module 3.

Referring to FIG. 6A, if the user does not want to receive messages transmitted by the at least one service device function module 3 in a text mode, he/she presses a voice key 2002 or an audio key 2001 of the function key area 20 of the phone interface 6 to change a text mode to a voice key mode or an audio mode. Hence, the messages are received in the voice key mode or in the audio mode, thus obtaining a multi-mode display.

Figure 8:
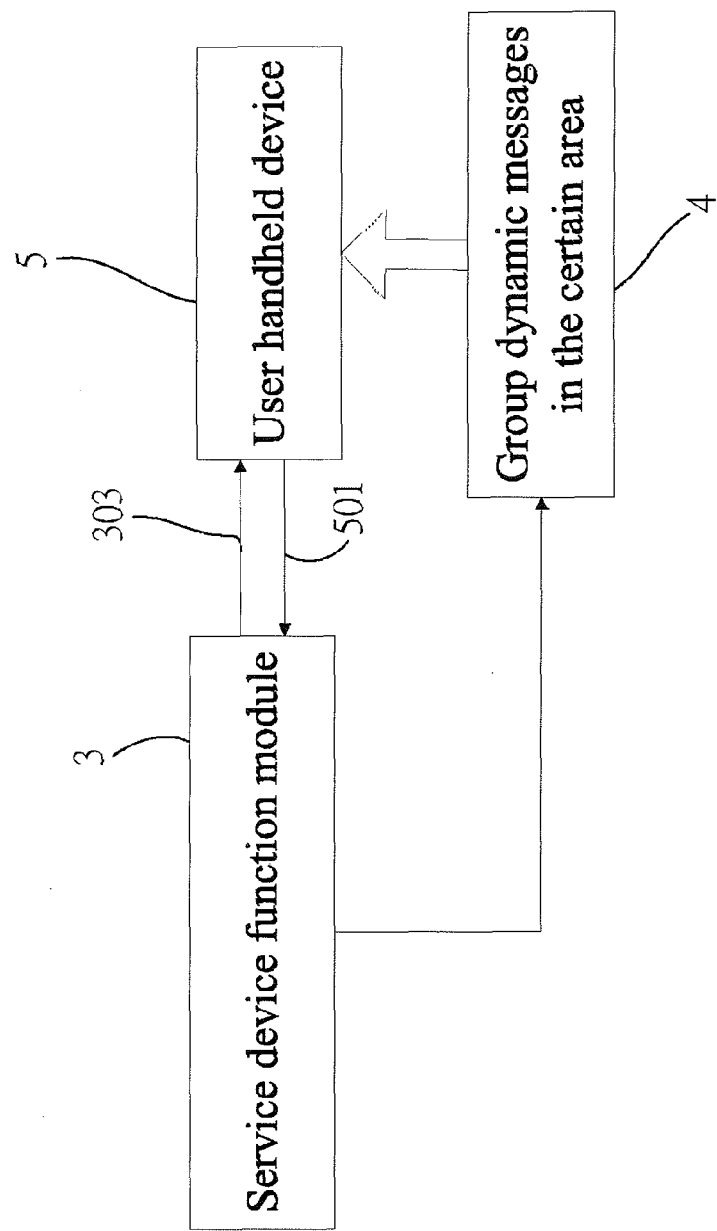
FIG. 8 is a flow chart showing the operation of the system for actively notifying the instant messages and the locations in the certain area and the method therefor according to the present invention.

With reference to FIGS. 2 and 8, when the user is one of a group of members, an authorized group manager inputs member names and phone numbers by ways of the back-site device function module 2, and the inputted member names and the phone numbers are transmitted to the at least one service device function module 3 and the Internet.

Figure 9:
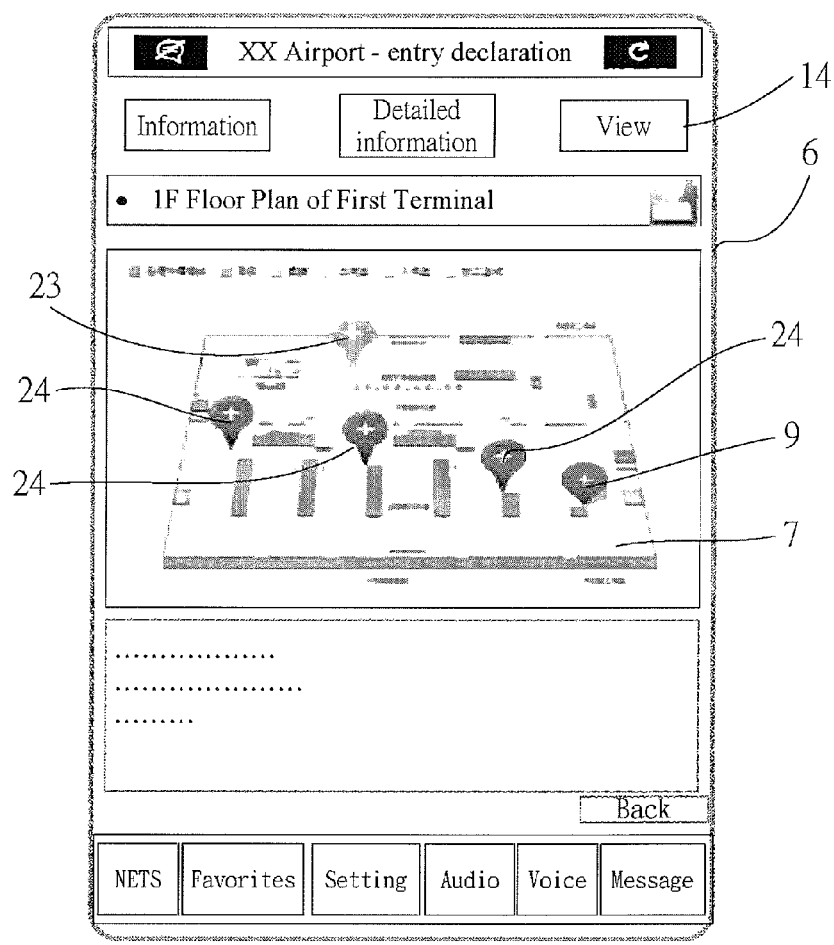
FIG. 9 is another diagram showing the operation of the system for actively notifying the instant messages and the locations in the airport and the method therefor according to the present invention.
Figure 10:
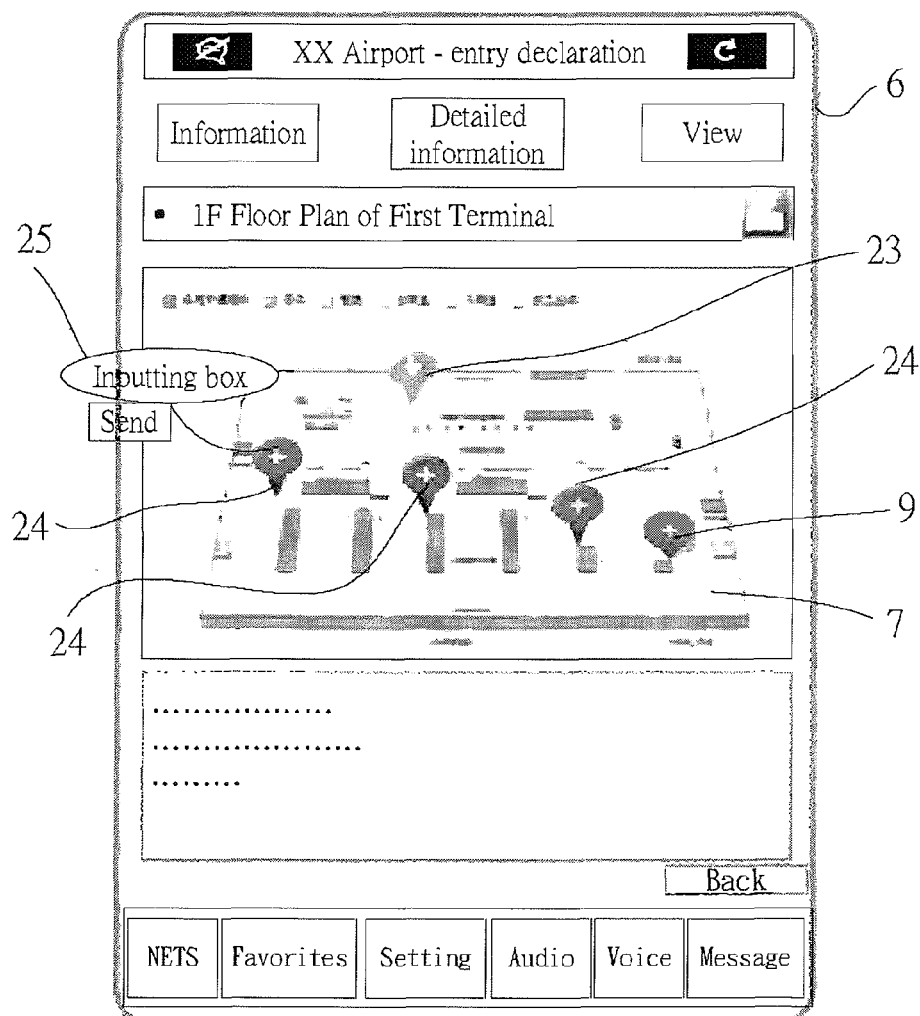
FIG. 10 is also a diagram showing the operation of the system for actively notifying the instant messages and the locations in the airport and the method therefor according to the present invention

Thereafter, each of the group members receives a set of identification codes, so that when the user enters the airport, the user handheld device 5 receives position, messages transmission 303 from the airport and automatically transmits the group identification code 503 to the at least one service device function module 3. Thereafter, the processing device function module 302 of the at least one service device function module 3 automatically judges whether the user is one of the group members. If so, a dynamic group managing device of the processing device function module 302 transmits the messages by using the WiFi device 301 of the at least one service device function module 3, so that positions where the group members are located are displayed on the regional map 7 of the airport. As shown in FIG. 9, when the user is one of the group members and presses the plan view key 14 of the phone interface 6, the at least one service device function module 3 optionally transmits a dynamic message 4 of the certain group members to the user handheld device 5, i.e., an individual position status of the phone interface 6 of FIG. 6D is changed to a group position status of FIG. 9, and a manager position 23, group member positions 24, and a user current position 9 are marked on the regional map 7 by using colors, such that the user clearly knows where all group member are located. In the meantime, when the user wants to contact one of the group members, he/she presses one position mark of the regional map 7 so that the phone interface 6 automaticity displays a notification inputting box 25 (as shown in FIG. 10) aside the one position mark of the regional map 7, and then, the user inputs and transmits a message. Thereafter, the message is further transmitted in the airport by ways of the WiFi device 301 of the at least one service device function module 3, thus contacting and communicating with the one of the group members free of cost.

With reference to FIGS. 1 to 3, when the system of the present invention is used in the certain area, such as a scenic spot, a method of the present invention comprises the following steps.

When people carry common handheld devices to the certain area, the at least one service device function module 3 in the certain area senses the common handheld devices (because WiFi functions of the handhelds device are set on an ON mode after people download an APP system or after they automatically set the WiFi functions), and greeting messages are transmitted to the common handheld devices. Thereafter, the at least one service device function module 3 automatically judges if the APP system is downloaded to the common handheld devices. If so, the at least one service device function module 3 provides the service messages of the certain area by using the language using system code 502 of the user handheld device 5. Thereafter, the user operates services and functions provided by the system of the present invention on the user handheld device 5.

If the at least one service device function module 3 judges the APP system is not downloaded to the common handheld devices, each common handheld device provides two download methods including displaying A/I points on the common handheld device, i.e., if the each common handheld device uses an A system, it displays A/I points of the A system, and if the each common handheld device uses an I system, it displays A/I points of the I system. After a download instruction is given, the APP system is downloaded via the Internet to learn the service messages and the functions provided by the system of the present invention. On the contrary, if the user does not agree to download the APP system, the each common handheld device automatically skips a downloading process, so the user cannot learn the service messages and the functions provided by the system of the present invention. The two download methods also include applying a QR Code scanning, i.e., people use a QR Code marked in the certain area to scan and download the APP system, such that the user learns the service messages and the functions provided by the system of the present invention. On the contrary, if the user does not agree to download the APP system, the QR Code scanning is not executed, so the user cannot learn the service messages and the functions provided by the system of the present invention.

Figure 11:
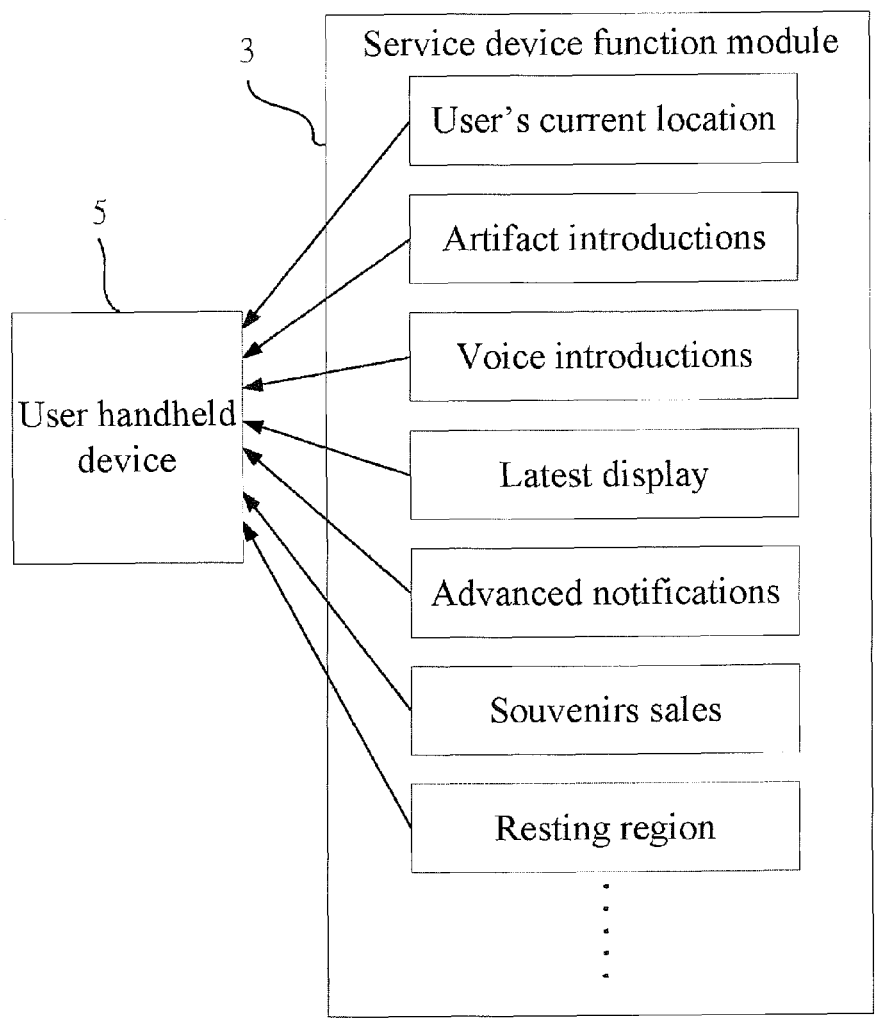
FIG. 11 is a diagram showing the operation of the system for actively notifying the instant messages and the locations in a scenic spot and the method therefor according to the present invention.

Referring further to FIGS. 2 and 11, when the user enters the certain area, a signal of the user handheld device 5 connects with the at least one service device function module 3, and the user handheld device 5 transmits the regional location message 501, the language using system code 502, and the group identification code 503 to the at least one service device function module 3. Then, the WiFi device 301 receives and transmits the regional location message 501, the language using system code 502, and the group identification code 503 to be further calculated and processed by the processing device function module 302. Thereafter, the at least one service device function module 3 transmits commonly used language messages and functions to the user according to the regional location message 501 and the language using system code 502. Thus, when the regional location message 501 displays the user is in the scenic spot, as shown in FIG. 11, the at least one service device function module 3 provides messages of the scenic spot to the user automatically, i.e., confirming the user's location in the scenic spot, providing voice introductions, latest display messages, advanced notifications, souvenirs sales information, and resting-regional locations. As illustrated in FIGS. 5A and 5B, a number of the at least one service device function module 3 which is arranged in the scenic spot depends on an area of the scenic spot, and the at least one service device function module 3 receives messages from the back-site device function module 2. The messages are inputted by renters (such as an enterprise 201, a store 202 or an individual 203), so the at least one service device function module 3 receives the same message. To avoid a plurality of service device function modules 3 in the same region of the scenic spot transmitting different messages to the user, the plurality of service device function modules 3 are limited to transmit one message to the user one time, i.e., the at least one device function module 3 automatically judges the user handheld device 5 which passes through. The WiFi device 301 transmits and judges signals to confirm if the user handheld device 5 has received a same message when it passes through the at least one device function module 3 at a A1 position. If not, the processing device function module 302 of the at least one service device function module 3 transmits the message to the user handheld device 5 at the A1 position. If the user handheld device 5 has received the same message when it passes through the at least one device function module 3 at the A1 position, the processing device function module 302 of the at least one service device function module 3 does not transmit the message to the user handheld device 5. In other words, when the user passes through the plurality of service device function modules 3 of the A1 position to A99 position in a same region, the user handheld device 5 only receives the one message transmitted by one of the plurality of service device function modules 3. In other words, the user handheld device does not repeatedly receive the same message transmitted from the A1 position to the A99 position in the same region.

Figure 12A:
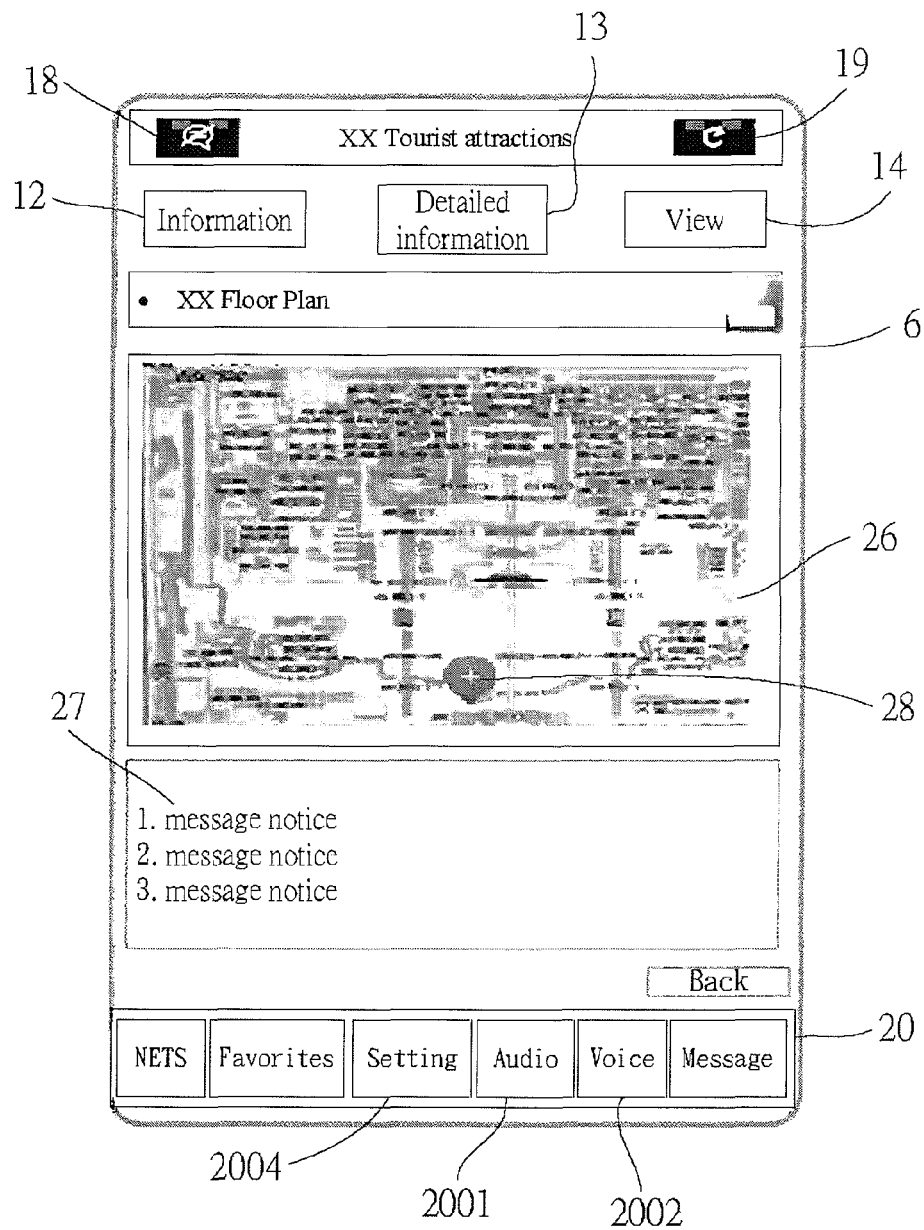
FIGS. 12A to 12D are diagrams showing the operation of the system for actively notifying the instant messages and the locations in the scenic spot and the method therefor according to the present invention.
Figure 12B:
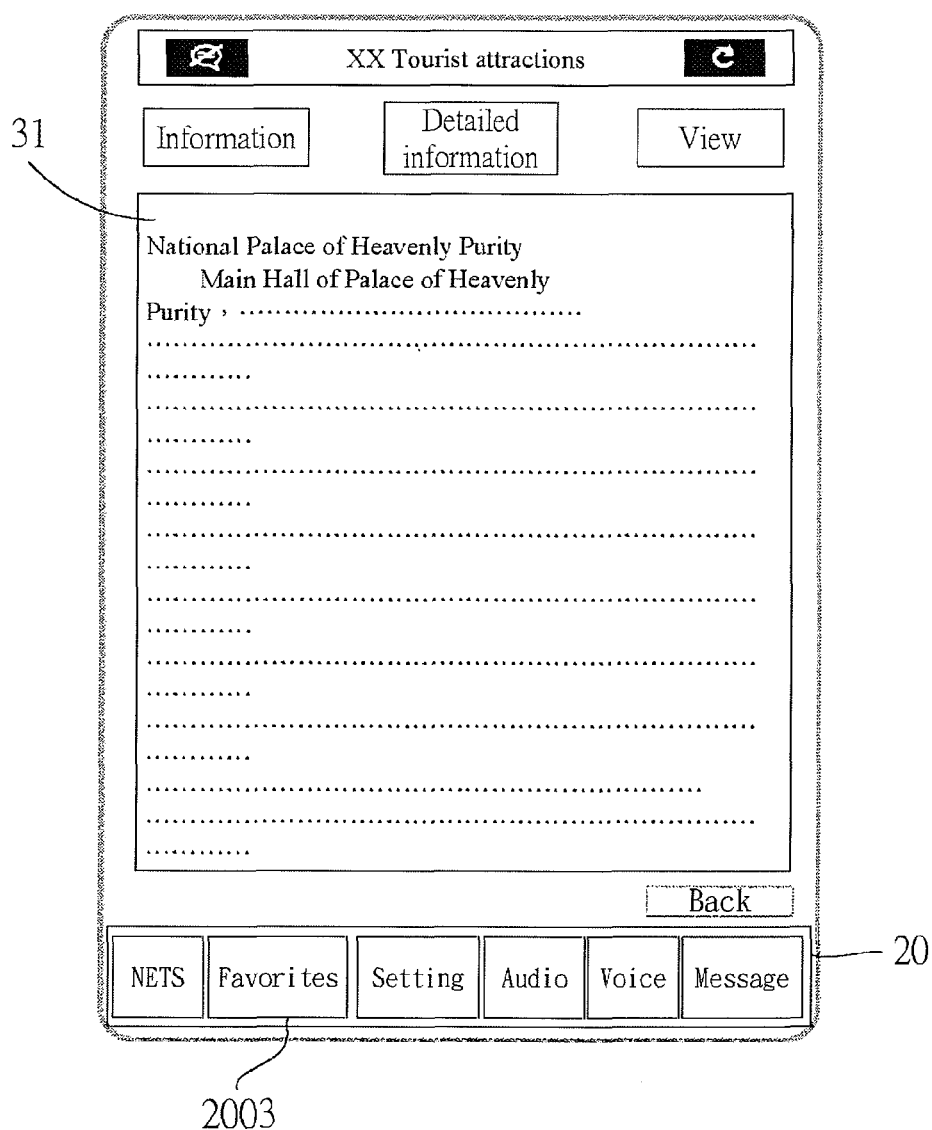
Figure 12C:
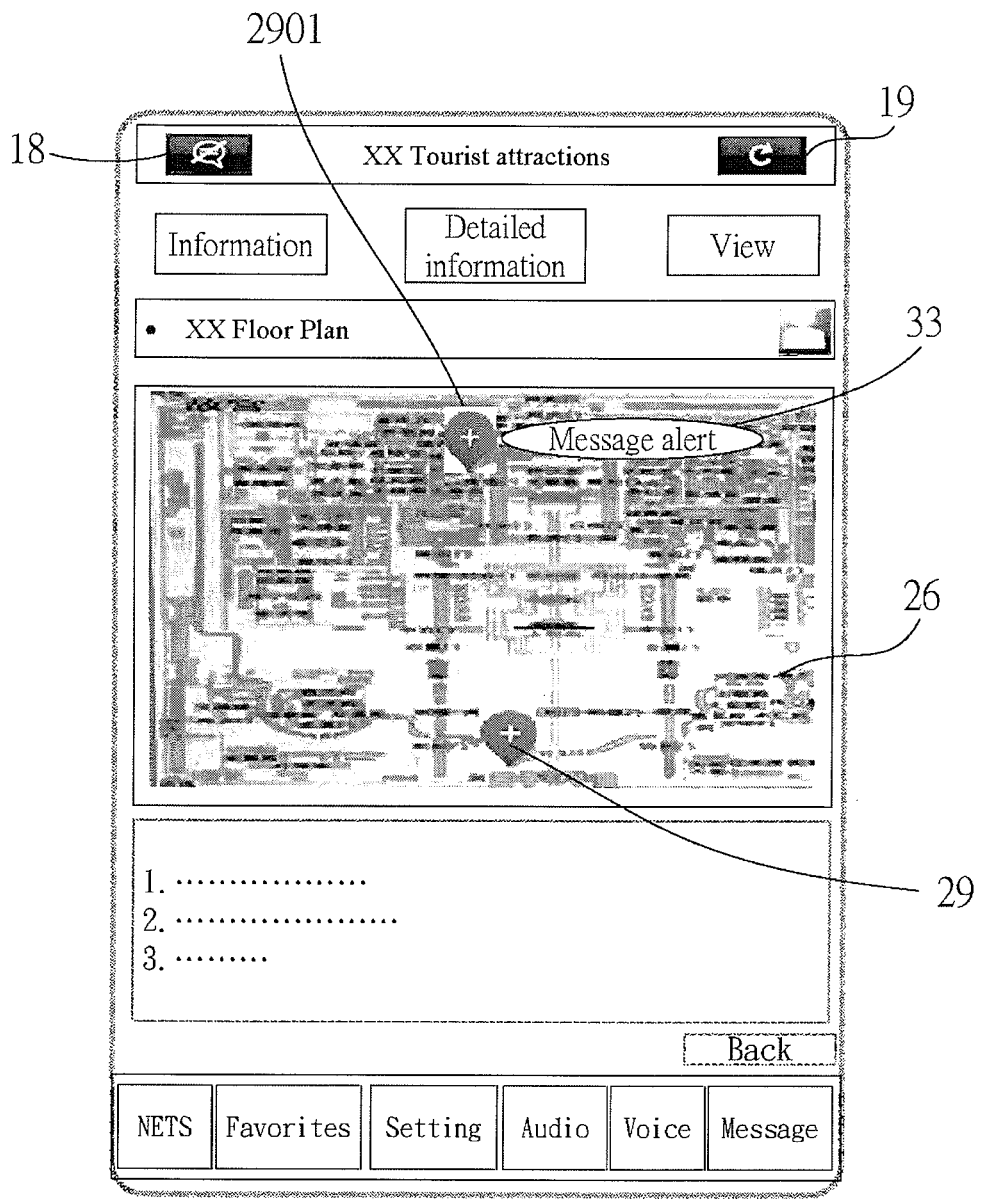

Referring further to FIG. 12A, when the user enters the scenic spot, the at least one service device function module 3 transmits related messages of the scenic spot to the user handheld device 5, and a phone interface 6 of the user handheld device 5 displays a message notice 27 and a regional map 26 of the scenic spot. Also, a current position 28 is automatically marked on the regional map 26 of the scenic spot, so that the user understands the current position 28 of the regional map 26 and the message notice 27 of the scenic spot. Because the phone interface 6 has three function keys (i.e., an all information key 12, a detailed information key 13, and a plan view key 14), and when the user presses the all information key 12 of the phone interface 6, the message notice 8 of the phone interface 6 shows a fixed-position message intrusion 31 of each message. As shown in FIG. 12B, the user stores desired information to a favorite file of a phone. In other words, the user presses a favorites key 2003 of a function key area 20 of the phone interface 6. When the user presses the detailed information key 13 of the phone interface 6, detailed information description of each message of the message notice 27 is displayed. FIG. 12C shows the detailed information description of each message being stored in the favorite file, and the user presses the favorites key 2003 of the function key area 20 of the phone interface 6 to store the detailed information description of each message in the favorite file. When the user presses the plan view key 14 of the phone interface 6, the phone interface 6 only displays the regional map 26 of the scenic spot. As illustrated in FIG. 12C, an original position 29 where the user enters the scenic spot and a designated location 2901 where the user has reached are automatically displayed on the regional map 26, and a message alert 33 is displayed to alert the user moving to the designated location 2901, such that the user clearly knows his/her direction and position in the scenic spot and does not get lost.

Figure 12D:
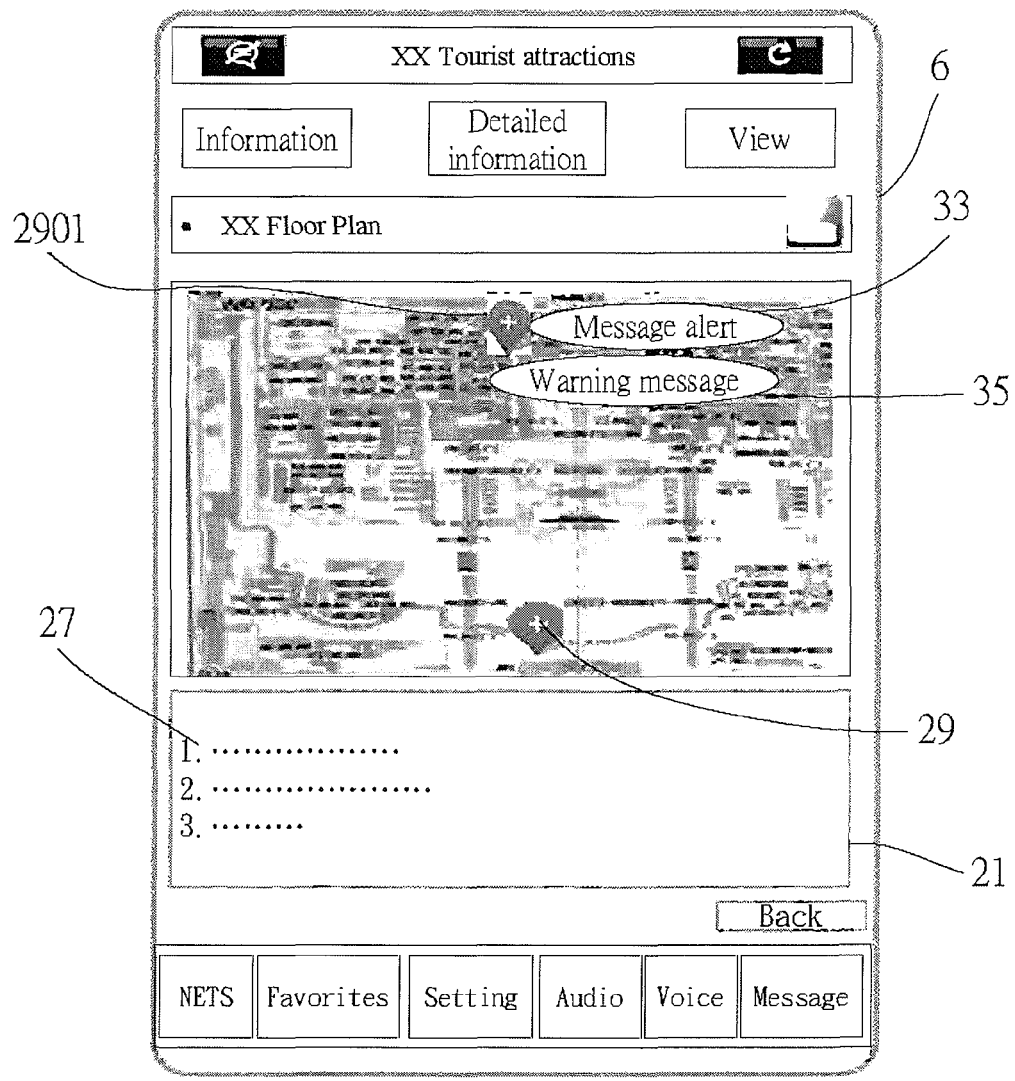

With reference to FIG. 12D, when the user leaves the scenic spot, the at least one service device function module 3 displays the message notice 27 on a message display area 21 of the phone interface 6 of the user handheld device 5. The message content and category of the message display area 21 are set in the back-site device function module 2 based on using requirements.

Referring further to FIG. 12A, when the user intends to set a time setting reminder in the scenic spot, he/she presses a setting key 2004 of the function key area 20 of the phone interface 6 resulting in an input box (not shown) appearing. The user inputs a reminding message, such as go to North Door of the Palace Museum at PM 6:00. As illustrated in FIG. 12D, if a set time is up, the at least one service device function module 3 transmits a sound and a warning message 35 to the user handheld device 5 to remind the user.

As shown in FIG. 12A, when the user enters the scenic spot and wants to update all the latest messages, he/she presses an updating key 19. If the user does not want to receive too many messages, he/she presses a no disturb key 18, so that the user handheld device 5 stops receiving messages transmitted from the at least one service device function module 3 until the user presses the no disturb key 18 again. Thereafter, the user handheld device 5 receives messages transmitted by the at least one service device function module 3.

Referring to FIG. 12A, if the user does not want to receive messages transmitted by the at least one service device function module 3 in a text mode, he/she presses a voice key 2002 or an audio key 2001 of the function key area 20 of the phone interface 6 to change a text mode to a voice key mode or an audio mode. Hence, the messages are received in the voice key mode or in the audio mode, thus obtaining a multi-mode display.

With reference to FIGS. 2 and 8, when the user is one of a group of members, and since an authorized group manager inputs member names and phone numbers by ways of the back-site device function module 2, the inputted member names and the phone numbers are transmitted to the at least one service device function module 3 and the Internet.

Figure 13:
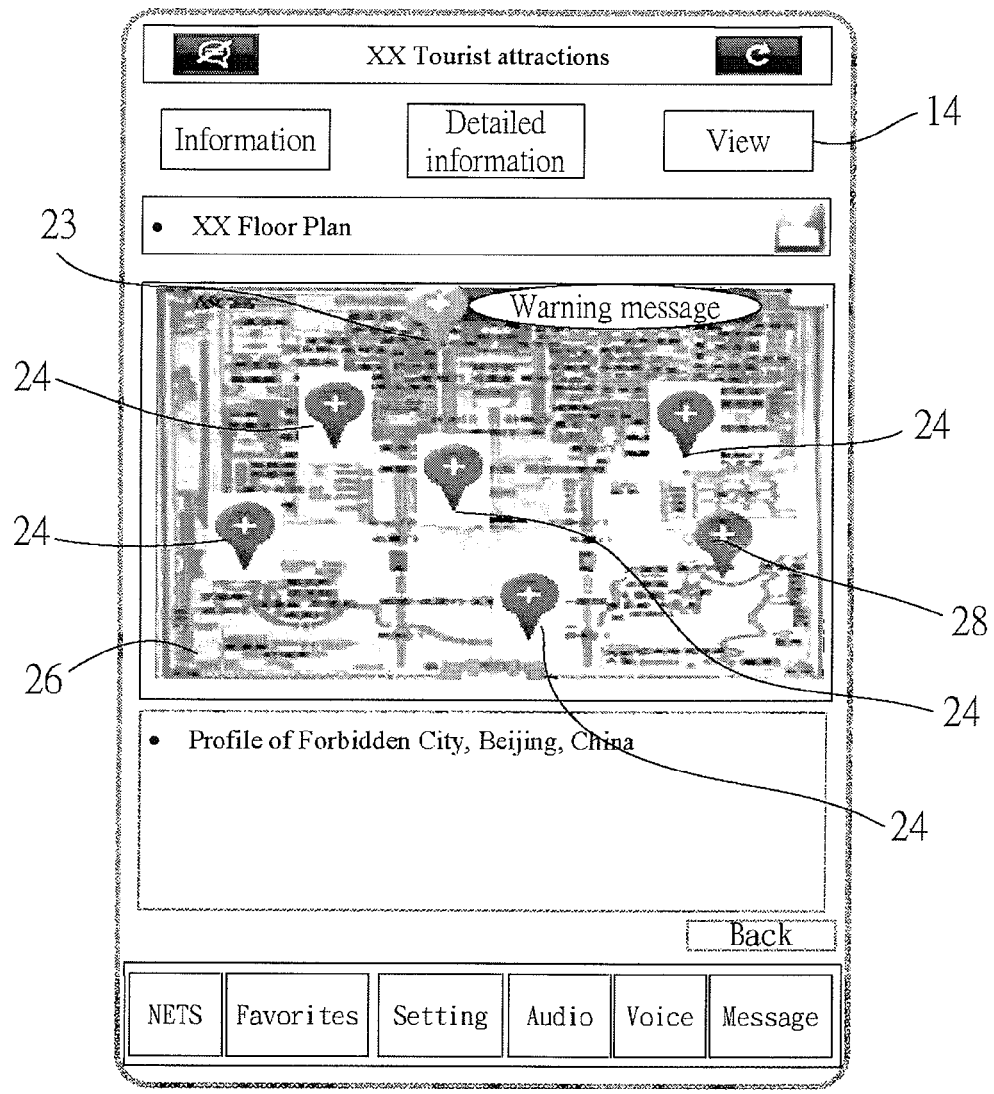
FIG. 13 is also a diagram showing the operation of the system for actively notifying the instant messages and the locations in the scenic spot and the method therefor according to the present invention.
Figure 14:
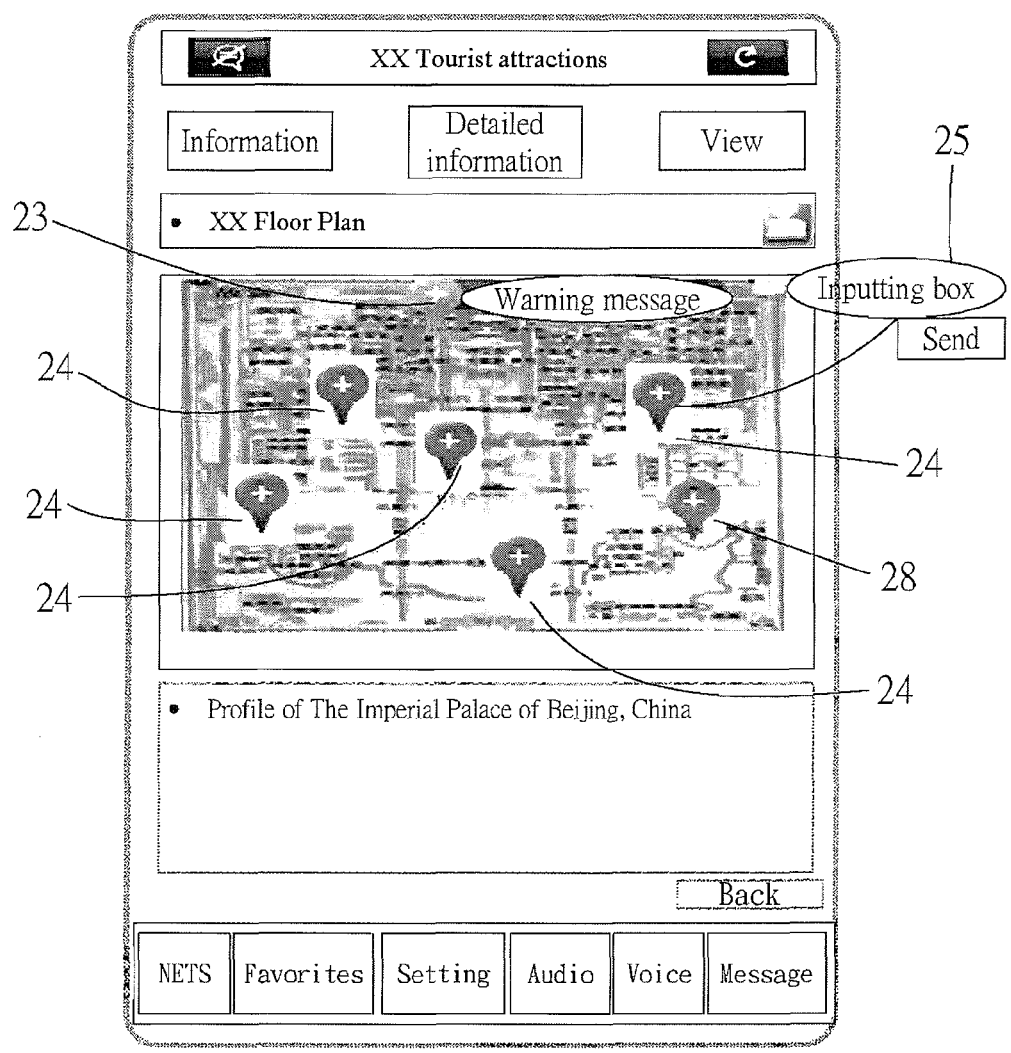
FIG. 14 is another diagram showing the operation of the system for actively notifying the instant messages and the locations in the scenic spot and the method therefor according to the present invention.

Thereafter, each of the group members receives a set of identification codes, so that when the user enters the scenic spot, the user handheld device 5 receives the messages transmitted from the scenic spot and automatically transmits the group identification code 503 to the at least one service device function module 3. Thereafter, the processing device function module 302 of the at least one service device function module 3 automatically judges whether the user is one of the group members. If so, a dynamic group managing device of the processing device function module 302 transmits the messages by using the WiFi device 301 of the at least one service device function module 3, so that positions where the group members are located are displayed on the regional map 26 of the scenic spot. As shown in FIG. 13, when the user is one of the group members and presses the plan view key 14 of the phone interface 6, (as shown in FIG. 8) the at least one service device function module 3 transmits a dynamic message 4 of the certain group members to the user handheld device 5, i.e., an individual position status of the phone interface 6 of FIG. 12A is changed to a group position status of FIG. 13, and a manager position 23, group member positions 24, and a user current position 28 are marked on the regional map 26 by using colors, such that the user clearly knows where all group member are located. In the meantime, when the user wants to contact one of the group members, he/she presses one position mark of the regional map 26, so that the phone interface 6 automaticity displays a notification inputting box 25 (as shown in FIG. 14) aside the one position mark of the regional map 26, and then the user inputs and transmits a message. Thereafter, the message is further transmitted in the scenic spot by ways of the WiFi device 301 of the at least one service device function module 3, thus contacting and communicating with the one of the group members free of cost.

With reference to FIGS. 1 to 3, when the system of the present invention is used in the certain area, such as a department store, a method of the present invention comprises the following steps.

When people carry common handheld devices to the certain area, the at least one service device function module 3 in the certain area senses the common handheld devices (because WiFi functions of the handhelds device are set on an ON mode after people download an APP system or after they automatically set the WiFi functions), and greeting messages are transmitted to the common handheld devices. Thereafter, the at least one service device function module 3 automatically judges if the APP system is downloaded to the common handheld devices. If so, the at least one service device function module 3 provides the messages of the certain area by using the language using system code 502 of the user handheld device 5. Thereafter, the user operates services and functions provided by the system of the present invention on the user handheld device 5.

If the at least one service device function module 3 judges the APP system is not downloaded to the common handheld devices, each common handheld device provides two download methods including displaying A/I points on the common handheld device, i.e., if the each common handheld device uses an A system, it displays A/I points of the A system, and if the each common handheld device uses an I system, it displays A/I points of the I system. After a download instruction is given, the APP system is downloaded via the Internet to learn service messages and the functions provided by the system of the present invention. On the contrary, if the user does not agree to download the APP system, the each common handheld device automatically skips a downloading process, so the user cannot learn the service messages and the functions provided by the system of the present invention. The two download methods also include applying a QR Code scanning, i.e., people use a QR Code marked in the certain area to scan and download the APP system, such that the user learns the service messages and the functions provided by the system of the present invention. On the contrary, if the user does not agree to download the APP system, the QR Code scanning is not executed, so the user cannot learn the service messages and the functions provided by the system of the present invention.

Figure 15:
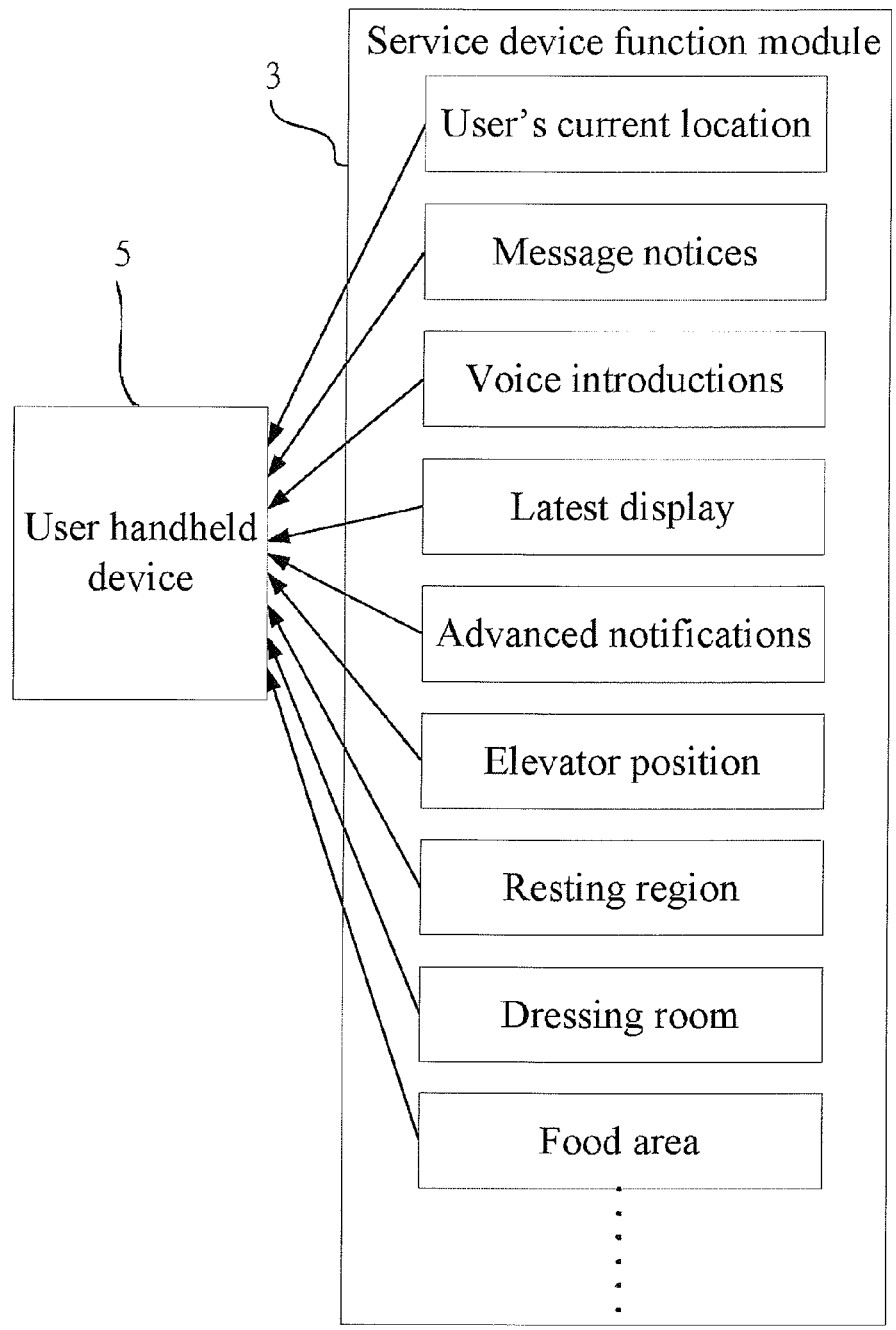
FIG. 15 is a diagram showing the operation of the system for actively notifying the instant messages and the locations in a department store and the method therefor according to the present invention.

Referring further to FIGS. 2 and 15, when the user enters the certain area, a signal of the user handheld device 5 connects with the at least one service device function module 3, and the user handheld device 5 transmits the regional location message 501, the language using system code 502, and the group identification code 503 to the at least one service device function module 3. The WiFi device 301 receives and transmits the regional location message 501, the language using system code 502, and the group identification code 503 to be further calculated and processed by the processing device function module 302. Thereafter, the at least one service device function module 3 transmits commonly used language messages and functions to the user according to the regional location message 501 and the language using system code 502. Thus, when the regional location message 501 displays the user is located at the department store, as shown in FIG. 15, the at least one service device function module 3 provides messages of the department store to the user automatically, i.e., confirming the user's location in the department store, providing message notifications, voice introductions, latest display messages, advanced notifications, elevator position messages, resting-regional locations, dressing room locations, and food area locations. As illustrated in FIGS. 5A and 5B, a number of the at least one service device function module 3 which is arranged in the department store depends on an area of the department store, and the at least one service device function module 3 receives messages from the back-site device function module 2. The messages are inputted by renters (such as an enterprise 201, a store 202 or an individual 203), so the at least one service device function module 3 receives the same message. To avoid a plurality of service device function modules 3 in the same region of the department store transmitting different messages to the user, the plurality of service device function modules 3 are limited to transmit one message to the user one time, i.e., the at least one device function module 3 automatically judges the user handheld device 5 which passes through. The WiFi device 301 transmits and judges signals to confirm if the user handheld device 5 has received a same message when it passes through the at least one device function module 3 at a A1 position. If not, the processing device function module 302 of the at least one service device function module 3 transmits the message to the user handheld device 5 at the A1 position. If the user handheld device 5 has received the same message when it passes through the at least one device function module 3 at the A1 position, the processing device function module 302 of the at least one service device function module 3 does not transmit the message to the user handheld device 5. In other words, when the user passes through the plurality of service device function modules 3 of the A1 position to A99 position in a same region, the user handheld device 5 only receives the one message transmitted by one of the plurality of service device function modules 3. In other words, the user handheld device does not repeatedly receive the same message transmitted from the A1 position to the A99 position in the same region.

Figure 16A:
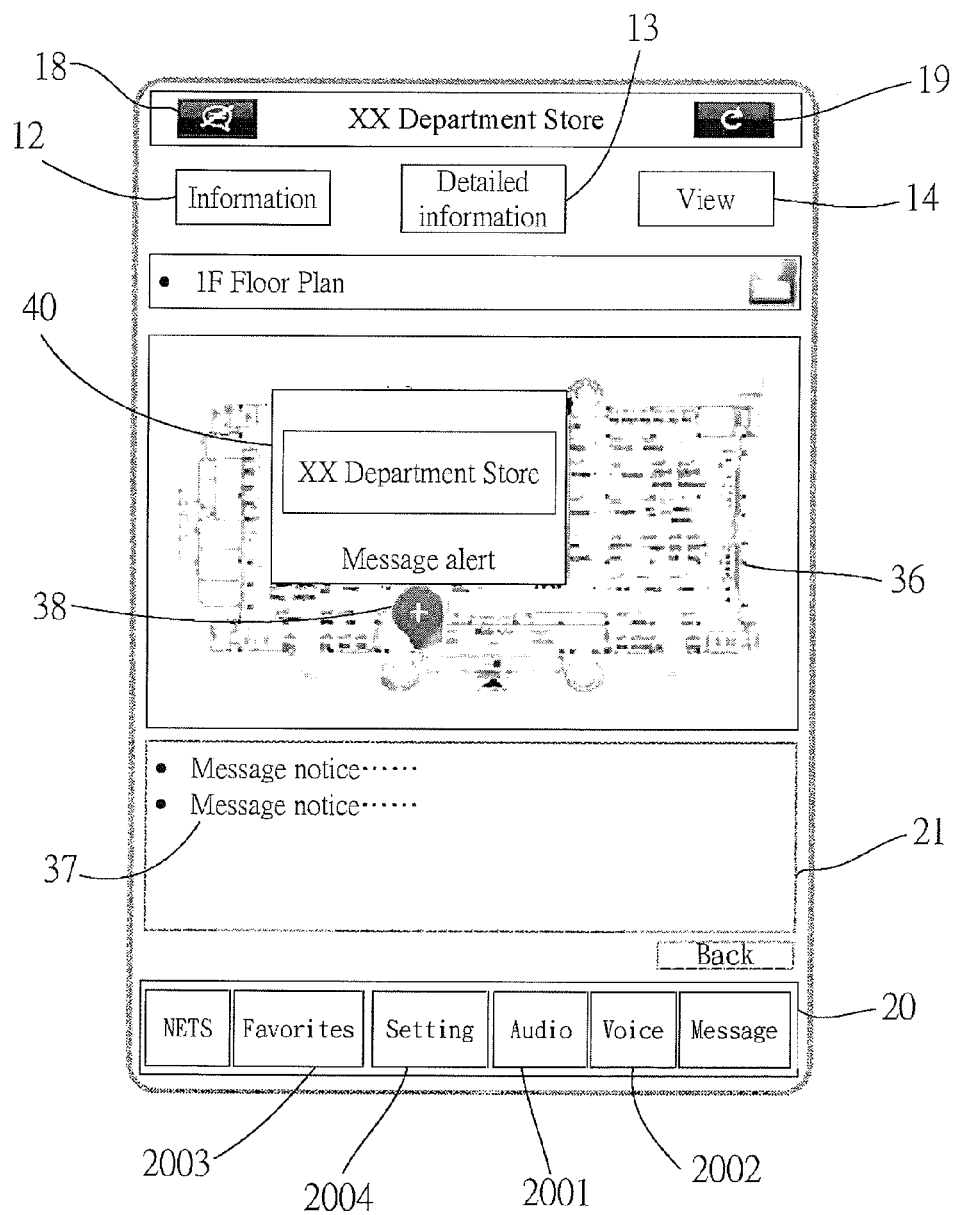
FIGS. 16A to 16D are diagrams showing the operation of the system for actively notifying the instant messages and the locations in the department store and the method therefor according to the present invention.
Figure 16B:
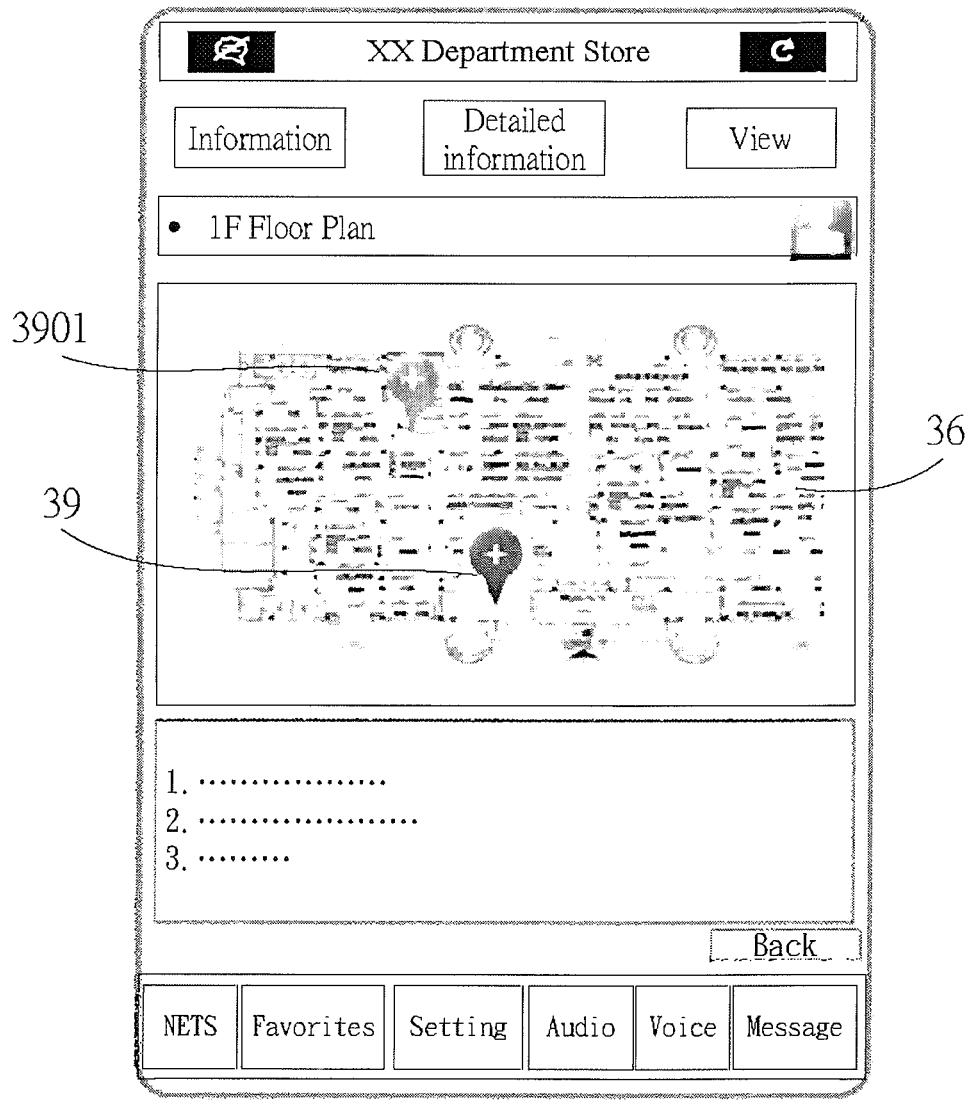

Referring further to FIG. 16A, when the user enters the department store, the at least one service device function module 3 transmits related messages of the department store to the user handheld device 5, and a phone interface 6 of the user handheld device 5 displays a message alert 40, a regional map 36 and a message notice 37 of the department store. Also, a current position 38 is automatically marked on the regional map 36 of the department store, so that the user understands the current position 38 of the regional map 36 and the message notice 37 of the department store. Because the phone interface 6 has three function keys (i.e., an all information key 12, a detailed information key 13, and a plan view key 14), and when the user presses the all information key 12 of the phone interface 6, the message notice 37 of the phone interface 6 shows all information of each message (not shown), and the user stores desired information to a favorite file of a phone. In other words, the user presses a favorites key 2003 of a function key area 20 of the phone interface 6. When the user presses the detailed information key 13 of the phone interface 6, all information of each message (not shown) of the message notice 37 is displayed. If the user desires to store all information of each message in the favorite file, he/she presses the favorites key 2003 of the function key area 20 of the phone interface 6 to store all information of each message in the favorite file. When the user presses the plan view key 14 of the phone interface 6, the phone interface 6 only displays the regional map 36 of the department store. As illustrated in FIG. 16B, an original position 39 where the user enters the department store and a designated location 3901 where the user has reached are automatically displayed on the regional map 36, such that the user clearly knows his/her direction and position in the department store and does not get lost.

With reference to FIG. 16A, when the user leaves the department store, the at least one service device function module 3 changes the message notice 37 to a leave traffic information (not shown) of the department store and displays the leave traffic information (not shown) of the department store on a message display area 21 of the phone interface 6 of the user handheld device 5. The message content and category of the message display area 21 are set in the back-site device function module 2 based on using requirements.

Referring further to FIG. 16A, when the user intends to set a time setting reminder at the department store, he/she presses a setting key 2004 of the function key area 20 of the phone interface 6 resulting in an input box (not shown) appearing. The user inputs a reminding message, such as please go to an information desk on 1st floor at PM 3:00. If a set time is up, the at least one service device function module 3 transmits a sound warning message (not shown) to the user handheld device 5 to remind the user.

As shown in FIG. 16A, when the user enters the department store and wants to update all the latest messages, he/she presses an updating key 19. If the user does not want to receive too many messages, he/she presses a no disturb key 18, so that the user handheld device 5 stops receiving messages transmitted from the at least one service device function module 3 until the user presses the no disturb key 18 again. Thereafter, the user handheld device 5 receives messages transmitted by the at least one service device function module 3.

Referring to FIG. 16A, if the user does not want to receive messages transmitted by the at least one service device function module 3 in a text mode, he/she presses a voice key 2002 or an audio key 2001 of the function key area 20 of the phone interface 6 to change a text mode to a voice key mode or an audio mode. Hence, the messages are received in the voice key mode or in the audio mode, thus obtaining a multi-mode display.

With reference to FIGS. 2 and 8, when the user is one of a group of members, an authorized group manager inputs member names and phone numbers by ways of the back-site device function module 2, and the inputted member names and the phone numbers are transmitted to the at least one service device function module 3 and the Internet.

Figure 16C:
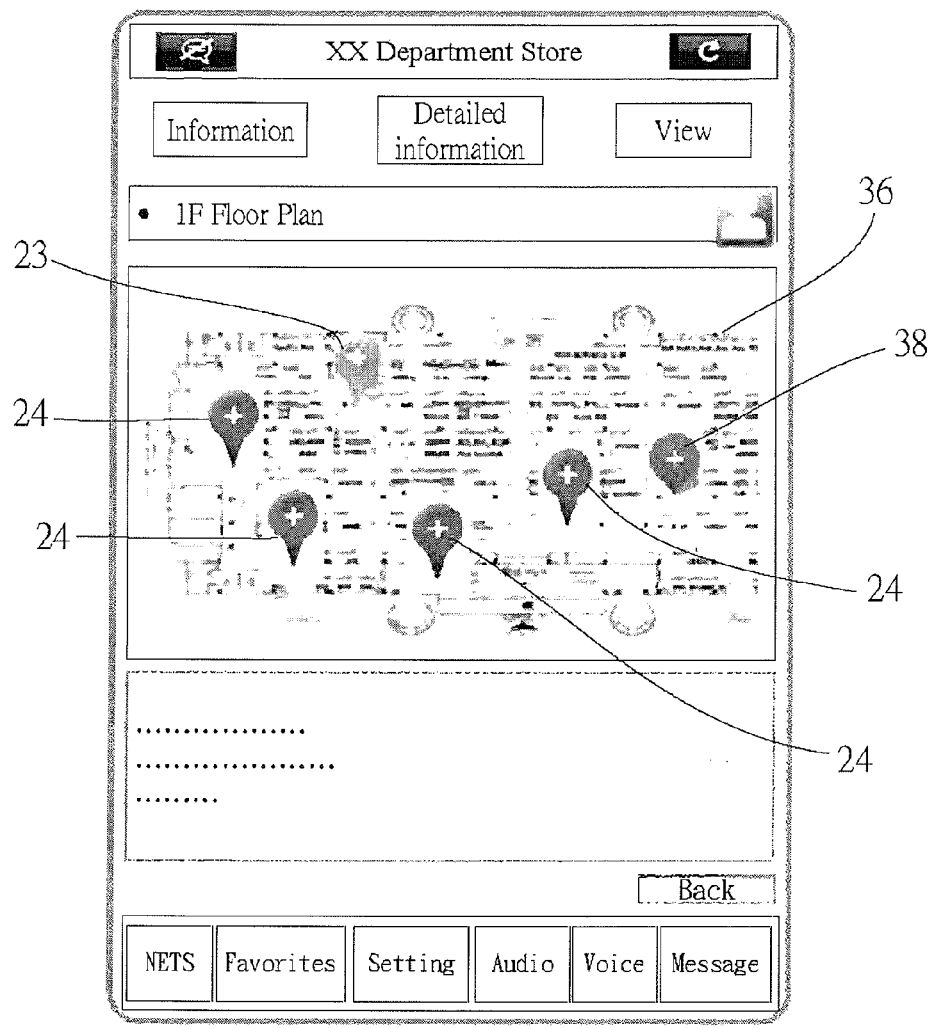
Figure 16D:
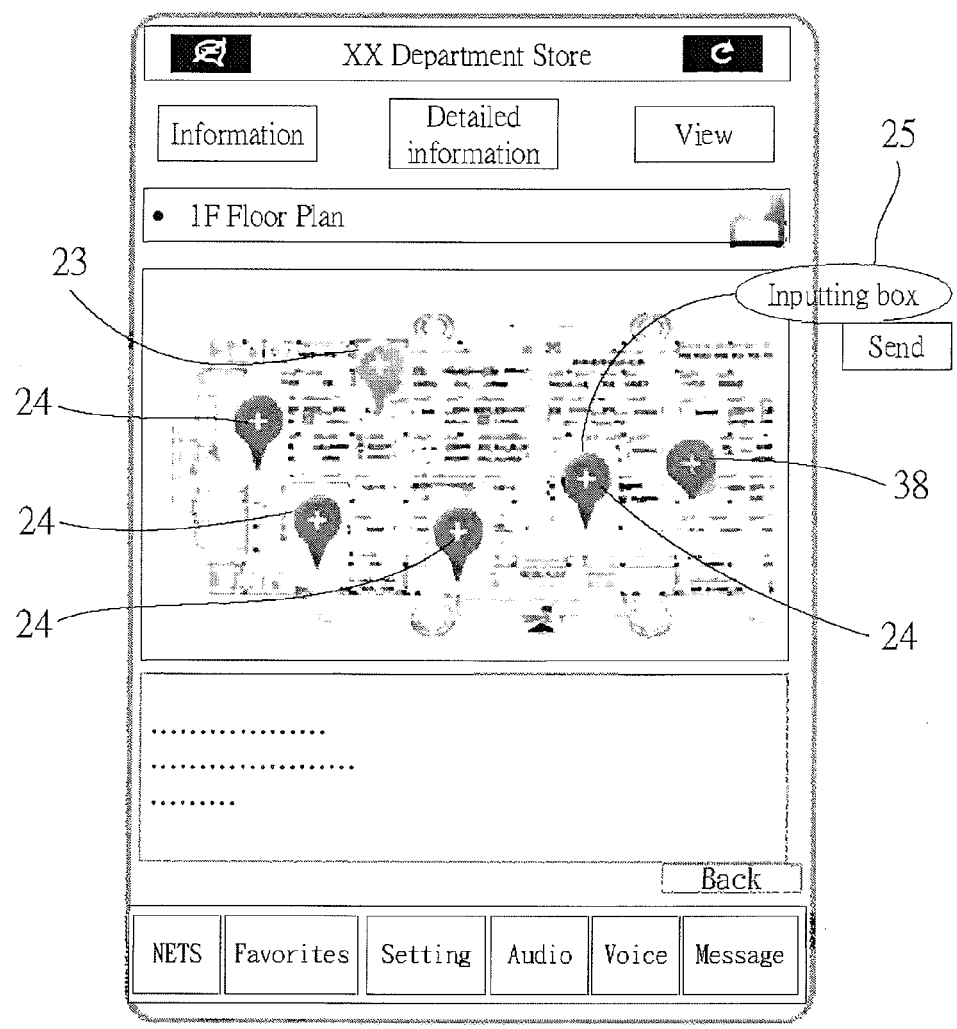

Thereafter, each of the group members receives a set of identification codes, so that when the user enters the department store, the user handheld device 5 receives the messages transmitted from the department store and automatically transmits the group identification code 503 to the at least one service device function module 3. Thereafter, the processing device function module 302 of the at least one service device function module 3 automatically judges whether the user is one of the group members. If so, a dynamic group managing device of the processing device function module 302 transmits the messages by using the WiFi device 301 of the at least one service device function module 3, so that positions where the group members are located are displayed on the regional map 36 of the department store. As shown in FIGS. 8 and 16C, when the user is one of the group members and presses the plan view key 14 of the phone interface 6, the at least one service device function module 3 optionally transmits a dynamic message 4 of the certain group members to the user handheld device 5. i.e., an individual position status of the phone interface 6 of FIG. 16B is changed to a group position status of FIG. 16C, and a manager position 23, group member positions 24, and a current position 9 are marked on the regional map 36 by using colors, such that the user clearly knows where all group member are located. In the meantime, when the user wants to contact one of the group members, he/she presses one position mark of the regional map 36 so that the phone interface 6 automaticity displays a notification inputting box 25 (as shown in FIG. 16D) aside the one position mark of the regional map 36, and, then, the user inputs and transmits a message. Thereafter, the message is further transmitted at the department store by ways of the WiFi device 301 of the at least one service device function module 3, thus contacting and communicating with the one of the group members free of cost.

With reference to FIGS. 1 to 3, when the system of the present invention is used in the certain area, such as a convenience store, a method of the present invention comprises the following steps.

When people carry common handheld devices to the certain area, the at least one service device function module 3 in the certain area senses the common handheld devices (because WiFi functions of the handhelds device are set in an ON mode after people download an APP system or after they automatically set the WiFi functions), and greeting messages are transmitted to the common handheld devices. Thereafter, the at least one service device function module 3 automatically judges if the APP system is downloaded to the common handheld devices. If so, the at least one service device function module 3 provides the messages of the certain area by using the language using system code 502 of the user handheld device 5. Thereafter, the user operates services and functions provided by the system of the present invention on the user handheld device 5.

If the at least one service device function module 3 judges the APP system is not downloaded to the common handheld devices, each common handheld device provides two download methods including displaying A/I points on the common handheld device, i.e., if the each common handheld device uses an A system, it, displays A/I points of the A system, and if the each common handheld device uses an I system, it displays A/I points of the I system. After a download instruction is given, the APP system is downloaded via the Internet to learn the service messages and the functions provided by the system of the present invention. On the contrary, if the user does not agree to download the APP system, the each common handheld device automatically skips a downloading process, so the user cannot learn the service messages and the functions provided by the system of the present invention. The two download methods also include applying a QR Code scanning, i.e., people use a QR Code marked in the certain area to scan and download the APP system, such that the user learns the service messages and the functions provided by the system of the present invention. On the contrary, if the user does not agree to download the APP system, the QR Code scanning is not executed, so the user cannot learn the service messages and the functions provided by the system of the present invention.

Figure 17:
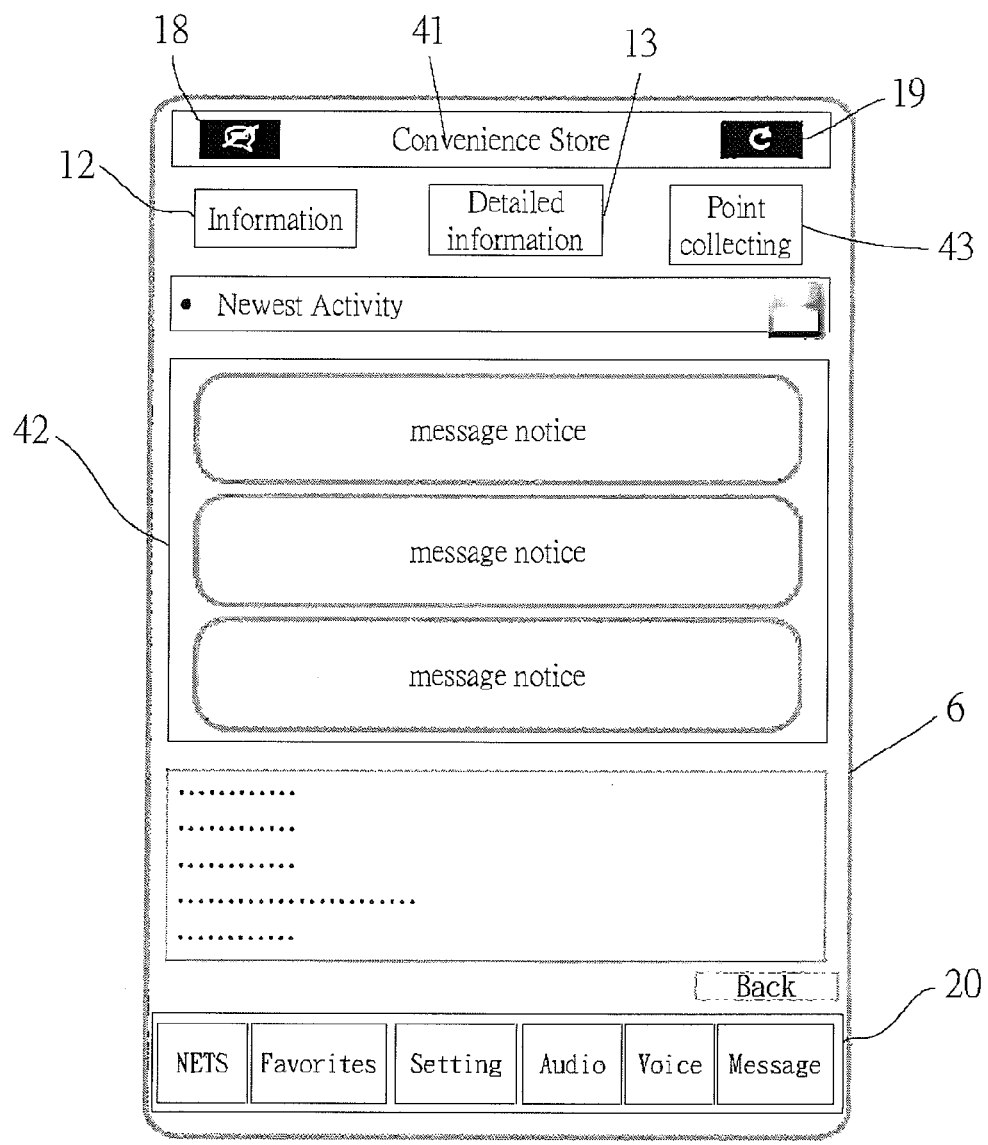
FIGS. 17 and 18 are diagrams showing the operation of the system for actively notifying the instant messages and the locations in a convenience store and the method therefor according to the present invention.

Referring further to FIGS. 2 and 17, when the user enters the certain area, a signal of the user handheld device 5 connects with the at least one service device function module 3, and the user handheld device 5 transmits the regional location message 501, the language using system code 502. Then, the WiFi device 301 transmits the regional location message 501 and the language using system code 502 to be further calculated and processed by the processing device function module 302. Thereafter, the at least one service device function module 3 transmits commonly used language messages and functions to the user according to the regional location message 501 and the language using system code 502. Thus, when a current position display 41 of the regional location message 501 is the convenience store, as shown in FIGS. 5A and 5B, the at least one service device function module 3 provides messages of the convenience store to the user automatically, i.e., confirming the user's location in the convenience store, providing voice introductions, latest display messages, advanced notifications, souvenirs sales information, and resting-regional locations. As illustrated in FIGS. 5A and 5B, a number of the at least one service device function module 3 which is arranged in the convenience store depends on an area of the convenience store, and the at least one service device function module 3 receives messages from the back-site device function module 2. The messages are inputted by renters (such as an enterprise 201, a store 202 or an individual 203), so the at least one service device function module 3 receives the same message. To avoid a plurality of service device function modules 3 in the same region of the convenience store transmitting different messages to the user, the plurality of service device function modules 3 are limited to transmit one message to the user one time, i.e., the at least one device function module 3 automatically judges the user handheld device 5 which passes through. The WiFi device 301 transmits and judges signals to confirm if the user handheld device 5 has received a same message when it passes through the at least one device function module 3 at a A1 position. If not, the processing device function module 302 of the at least one service device function module 3 transmits the message to the user handheld device 5 at the A1 position. If the user handheld device 5 has received the same message when it passes through the at least one device function module 3 at the A1 position, the processing device function module 302 of the at least one service device function module 3 does not transmit the message to the user handheld device 5. In other words, when the user passes through the plurality of service device function modules 3 of the A1 position to A99 position in a same region, the user handheld device 5 only receives the one message transmitted by one of the plurality of service device function modules 3. In other words, the user handheld device does not repeatedly receive the same message transmitted from the A1 position to the A99 position in the same region.

Figure 18:
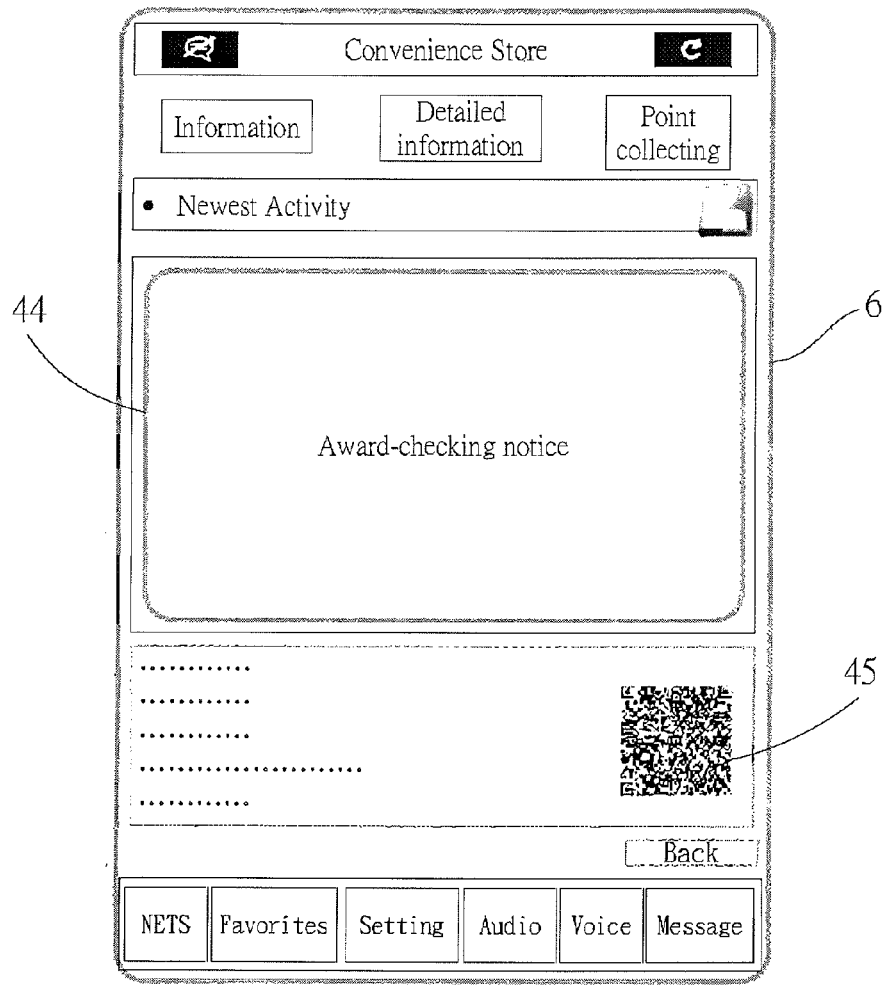

Referring further to FIG. 17, when the user enters the convenience store, the at least one service device function module 3 transmits related messages of the convenience store to the user handheld device 5, and a phone interface 6 of the user handheld device 5 displays a message notice 42 of the convenience store, so that the user understands the current message notice 42 of the convenience store. Because the phone interface 6 has three function keys (i.e., an all information key 12, a detailed information key 13, and a point collecting key 43), and when the user presses the all information key 12 of the phone interface 6, the message notice 42 of the phone interface 6 shows all information of each message (not shown). When the user presses the point collecting key 43 of the phone interface 6, an award-checking notice 44 for checking a point collection card is displayed on the phone interface 6 as illustrated in FIG. 18. In the meantime, the user presses a QR Code scanning key 45 to start a QR code scanning function, aligns a camera lens of the user handheld device with a bar code of an invoice, and scans the bar code. Thereafter, the system of the present invention automatically connects with the at least one service device function modules 3 of the convenience store to check invoice amount and if the invoice is true and false. If the invoice is true, the system of the present invention automatically calculates points based on the invoice amount and displays the award-checking notice 44 on the phone interface 6 in a pattern manner, with the pattern manner set by the convenience store.

As shown in FIG. 17, when the user enters the convenience store and wants to update all the latest messages, he/she presses an updating key 19. If the user does not want to receive too many messages, he/she presses a no disturb key 18, so that the user handheld device 5 stops receiving messages transmitted from the at least one service device function module 3 until the user presses the no disturb key 18 again. Thereafter, the user handheld device 5 receives messages transmitted by the at least one service device function module 3.

While various embodiments in accordance with the present invention have been shown and described, it is clear to those skilled in the art that further embodiments may be made without departing from the scope of the present invention.

What is claimed is:

1. A system for actively notifying instant messages and locations in a certain area comprising:
    a service device function module having a processing device function module and a WiFi (Wireless Fidelity) device;
    a back-site device function module;
    a user handheld device;
    a controlling device function module judging messages and functions inputted from the back-site device function module and transmitted to the processing device function module of the service device function module, wherein the controlling device function module judges when a using contract is valid to determine when the messages and the functions of the service device function module are processed and are transmitted to the user handheld device by ways of the WiFi (Wireless Fidelity) device of the service device function module;
    wherein the back-site device function module chooses and controls the messages transmitted to the processing device function module of the service device function module, and wherein the controlling device function module judges when the using contract is valid to determine whether the messages of the processing device function module are transmitted to the user handheld device;
    wherein the service device function module judges when the user handheld device is one of a group of user handheld devices, wherein when the user handheld device is one of the group of user handheld devices, the service device function module transmits the messages to the user handheld device from the back-site device function module using the WiFi device of the service device module including positions where the group of user handheld devices are located, wherein the processing device function module has a text device module, a voice device module, an illustrated device module, an audiovisual device, a record storage module, a location information recording device module, a multi-language module, and a dynamic group management device module, wherein the WiFi device calculates the messages of the processing device function module based on messages and internal codes transmitted from the user handheld device to provide messages and locations in the certain area to the user handheld device based on a using, language;
    wherein the user handheld device transmits a regional location message, a language using system code, and a group identification code of the user handheld device to the service device function module, with the user handheld device in the certain area, language messages are processed by the processing device function module of the service device function module and are transmitted to the user handheld device from the WiFi device, with the user handheld device receiving the language messages and language functions from the service device function module, with the service device function module judging a user's group type, wherein when the user's group type is identical to group members, the service device function module transmits a dynamic message of the group members to the user handheld device to provide group members' locations displayed on a map of the user handheld device, wherein the user handheld device and the group members transmit message signals to each other by the service device function module to contact and communicate with the group members.

2. A method for actively notifying instant messages and locations in a certain area comprising:
    sensing when a user handheld device is carried to the certain area by a plurality of service device function modules in the certain area, transmitting greeting messages to the user handheld device carried to the certain area, and judging when an APP (Application) system is downloaded to the user handheld device, with each service device function module having a processing device function module and a WiFi (Wireless Fidelity) device;
    when the APP system is downloaded to the user handheld device, providing messages of the certain area to the user handheld device, and operating services and functions provided by the APP system on the user handheld device;
    when the APP system is not downloaded to the user handheld device, downloading the APP system via Internet to learn the services and the functions provided by the APP system on the user handheld device and operating the services and the functions provided by the APP system on the user handheld device;
    when the user handheld device enters the certain area, connecting a signal of the user handheld device with one of the plurality of service device function modules, and wherein the processing device function module of the one of the plurality of service device function modules processes and calculates and transmits the messages and the functions of the certain area to the user handheld device based on a regional location message and language using system code;
    choosing and controlling the messages transmitted to the processing device function module of the one of the plurality of service device function module by a back-site device function module;
    judging messages and functions inputted from the back-site device function module and transmitted to the processing device function module of the one of the plurality of service device function modules by a controlling device function module, with the controlling device function module judging when a using contract is valid to determine when the messages and the functions of the one of the plurality of service device function modules are processed and are transmitted to the user handheld device by ways of the WiFi device of the one of the plurality of service device function modules, with the controlling device function module judging when the using contract is valid to determine whether the messages of the processing device function module are transmitted to the user handheld device;

with the service device function module transmitting the messages to the user handheld device from the back-site device function module using the WiFi device of the one of the plurality of service device modules including positions where a group of user handheld devices are located, wherein the processing device function module has a text device module, a voice device module, an illustrated device module, an audio-visual device, a record storage module, a location information recording device module, a multi-language module, and a dynamic group management device module, with the WiFi device calculating the messages of the processing device function module of the one of the service device function modules based on messages and internal codes transmitted from the user handheld device to provide messages and locations in the certain area to the user handheld device based on a using language;

judging when the user handheld device receives a same message when passing through the certain area using the WiFi device, and when receiving the same message, preventing all but one of the plurality of service device function modules from transmitting the message and limiting the plurality of service device function modules to transmit one message to the user handheld device one time, wherein the plurality of service device function modules automatically judges and confirms to avoid the user handheld device repeatedly receiving the messages from the one of the plurality of service device function modules;

when the user handheld device enters the certain area, displaying on a phone interface of the user handheld device a regional map, a message notice of the certain area, and a current position automatically marked on the regional map, with the user handheld device transmitting a regional location message, a language using system code, and a group identification code of the user handheld device to the one of the plurality of service device function modules;

processing language messages by the processing device function module of the one of the plurality of service device function modules and transmitting the language message to the user handheld device in the certain area from the WiFi device, with the user handheld device receiving the language messages and language functions from the one of the plurality of service device function modules, with the one of the plurality of service device function modules judging a user's group type, when the user's group type is identical to group members, the service device function module transmitting a dynamic message of the group members to the user handheld device to provide group members' locations displayed on the regional map of the user handheld device, wherein the user handheld device and the group members transmit message signals to each other by the plurality of service device function modules to contact and communicate with the group members; and when the user handheld device leaves the certain area, displaying traffic information of the certain area on a message display area of the phone interface of the user handheld device.

3. The method as claimed in claim 2, wherein sensing the user handheld device includes setting WiFi functions of the user handheld device in an ON mode after downloading the APP system.

4. The method as claimed in claim 2, wherein when the certain area is an airport, the messages of the airport are transmitted to the user handheld device; when the certain area is a scenic spot, the messages of the scenic spot are transmitted to the user handheld device; when the certain area is a department store, the messages of the department store are transmitted to the user handheld device; and when the certain area is a convenience store, the messages of the convenience store are transmitted to the user handheld device.

5. The method as claimed in claim 2, wherein limiting the plurality of service device function modules includes limiting the plurality of service device function modules to not transmit a same message to the user handheld device.

6. The method as claimed in claim 2, wherein displaying on the phone interface comprises displaying on the phone interface including an all information key, a detailed information key, and a plan view key, and wherein when the all information key or the detail information key of a single message or a plan view of the certain area is chosen, desired information is added in a favorite file for review when off-line.

7. The method as claimed in claim 2, further comprising pressing a setting key of the phone interface so that an input box appears and inputting a reminding message, and when a set time is up, transmitting a sound and a warning message to the user handheld device.

8. The method as claimed in claim 2, further comprising pressing an updating key to update the messages; and pressing a no disturb key so that the user handheld device stops receiving the messages transmitted from the plurality of service device function modules until the no disturb key is pressed again.

9. The method as claimed in claim 2, further comprising pressing a voice key or an audio key of the phone interface to change a text mode to a voice key mode or an audio mode, thus obtaining a multi-mode display.

10. The method as claimed in claim 2, wherein sensing the user handheld device comprises sensing whether the user handheld device is one of the group of user handheld devices and displaying where the group of user handheld devices are located on the regional map, wherein a manager position, positions of the group of user handheld devices, and a position of the user handheld device are marked on the regional map by using colors.

11. The method as claimed in claim 9, further comprising pressing one position mark of the regional map with the phone interface automatically displaying a notification inputting box aside the one position mark of the regional map, inputting a message in the notification inputting box and transmitting the message.

12. The method as claimed in claim 9, further comprising inputting member names and phone numbers by ways of the back-site device function module, and transmitting the member names and phone numbers to the plurality of service device function modules and the Internet, with each of the group of user handheld devices receiving a set of identification codes.

13. The method as claimed in claim 2, further comprising setting message content and category of the message display area in the back-site device function module based on using requirements.

14. The method as claimed in claim 2, wherein downloading the APP system includes displaying A/I points on the user handheld device; and giving download instructions.

15. The method as claimed in claim 14, wherein downloading the APP system includes: scanning a QR (Quick Response) code and downloading the APP system.

16. The method as claimed in claim 2, wherein downloading the APP system includes: scanning a QR (Quick Response) code and downloading the APP system.

17. The method as claimed in claim 2, further comprising pressing an updating key to update the messages.

18. The method as claimed in claim 2, further comprising pressing a no disturb key so that the user handheld device stops receiving the messages transmitted from the plurality of service device function modules until the no disturb key is pressed again.

\* \* \* \* \*